(12) United States Patent
Tajima et al.

(10) Patent No.: US 7,337,454 B2
(45) Date of Patent: Feb. 26, 2008

(54) DISC CARTRIDGE

(75) Inventors: Hideharu Tajima, Izumi (JP);
Nobuyuki Takamori, Kitakatsuragi-gun (JP); Akira Takahashi, Nara (JP);
Yoshiteru Murakami, Nishinomiya (JP)

(73) Assignee: Sharp Kabushiki Kaisha, Osaka (JP)

( * ) Notice: Subject to any disclaimer, the term of this patent is extended or adjusted under 35 U.S.C. 154(b) by 556 days.

(21) Appl. No.: 10/407,038

(22) Filed: Apr. 3, 2003

(65) Prior Publication Data

US 2003/0193887 A1 Oct. 16, 2003

(30) Foreign Application Priority Data

Apr. 11, 2002 (JP) ............................. 2002-109762
Sep. 19, 2002 (JP) ............................. 2002-273819

(51) Int. Cl.
*G11B 23/03* (2006.01)

(52) U.S. Cl. ....................... 720/738; 720/739

(58) Field of Classification Search ............... 720/728, 720/738
See application file for complete search history.

(56) References Cited

U.S. PATENT DOCUMENTS

| | | | | |
|---|---|---|---|---|
| 5,226,035 A | * | 7/1993 | Kato et al. ................... | 720/744 |
| 5,986,992 A | * | 11/1999 | Bardmesser ................ | 720/728 |
| 6,021,029 A | | 2/2000 | Mamiya et al. | |
| 6,198,718 B1 | * | 3/2001 | Watanabe et al. ........... | 720/738 |
| 2003/0099188 A1 | * | 5/2003 | Kurozuka et al. .......... | 369/291 |

FOREIGN PATENT DOCUMENTS

| | | | |
|---|---|---|---|
| JP | 58-1407571 U | | 9/1983 |
| JP | 60251576 A | * | 12/1985 |
| JP | 1-165964 U | | 11/1989 |
| JP | 4-6869 U | | 1/1992 |
| JP | 4-92273 | | 3/1992 |
| JP | 4-241283 | | 8/1992 |
| JP | 5-15174 U | | 2/1993 |
| JP | 7-21734 | | 1/1995 |
| JP | 8-235825 | | 9/1996 |
| JP | 10-64224 A | | 3/1998 |
| JP | 2000-030396 | | 1/2000 |
| JP | 2001-23329 | | 1/2001 |
| JP | 2001-126432 | | 5/2001 |
| JP | 2002-288961 | | 10/2002 |
| JP | 2003-157640 | | 5/2003 |

* cited by examiner

*Primary Examiner*—Angel Castro
*Assistant Examiner*—Christopher R. Magee
(74) *Attorney, Agent, or Firm*—David G. Conlin; William J. Daley, Jr.; Edwards Angell Palmer & Dodge LLP

(57) ABSTRACT

A disc cartridge of the present invention is provided with a protrusion section on a shutter sliding surface so as to surround at least part of an opening. Moreover, a shutter for opening and closing the opening is provided with a shielding section for covering the opening and the protrusion section and a sliding surface for sliding on a shutter sliding surface during opening and closing operations of the shutter.

18 Claims, 15 Drawing Sheets

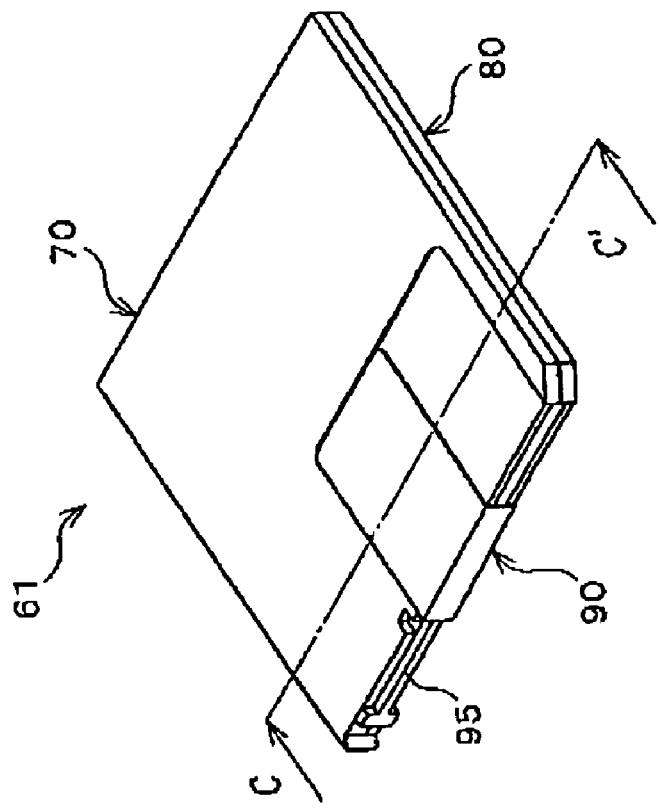
FIG. 8 (a) Prior Art
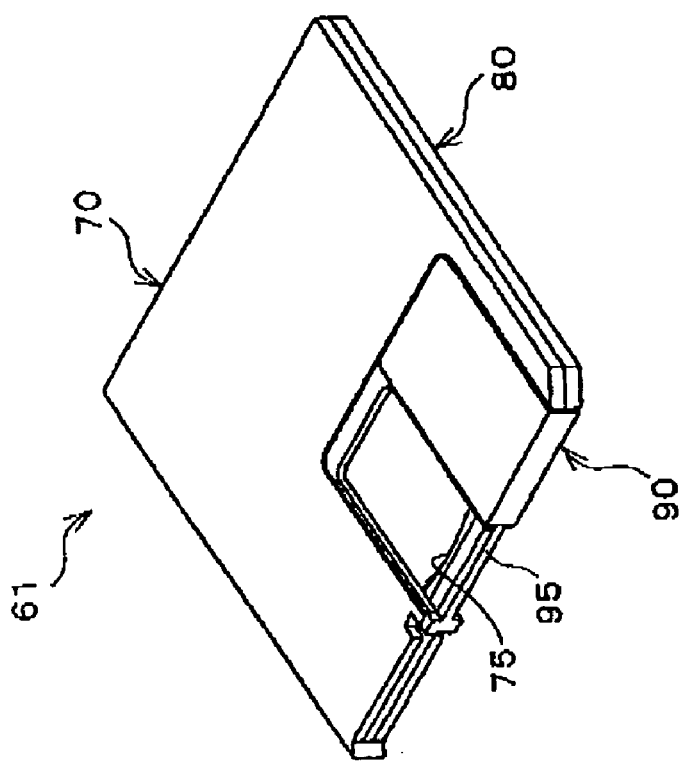
FIG. 8 (b) Prior Art

FIG. 11 (a) Prior Art
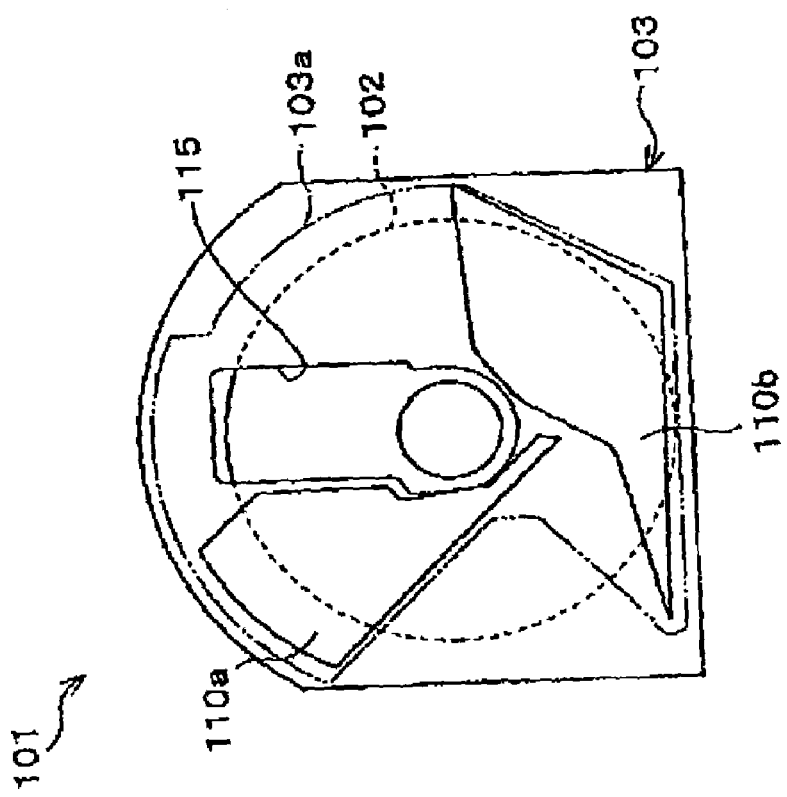
FIG. 11 (b) Prior Art
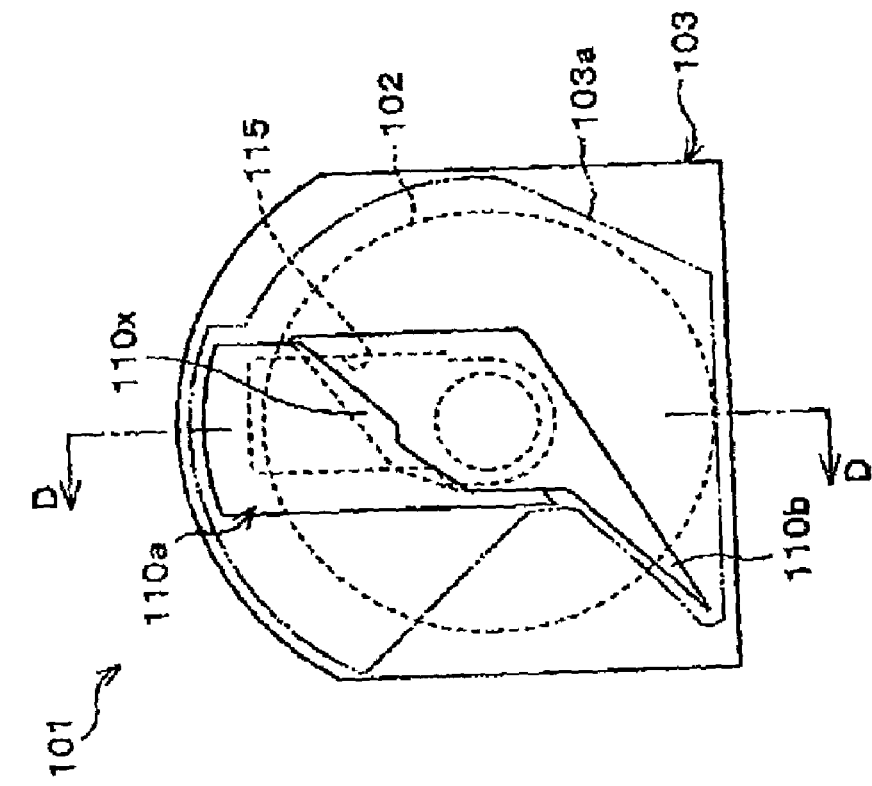

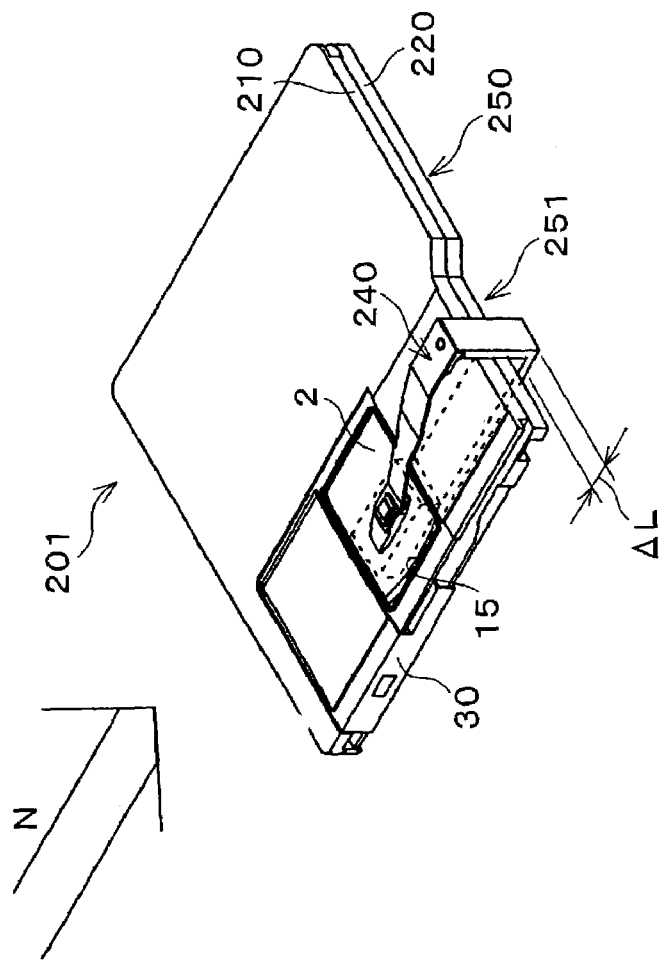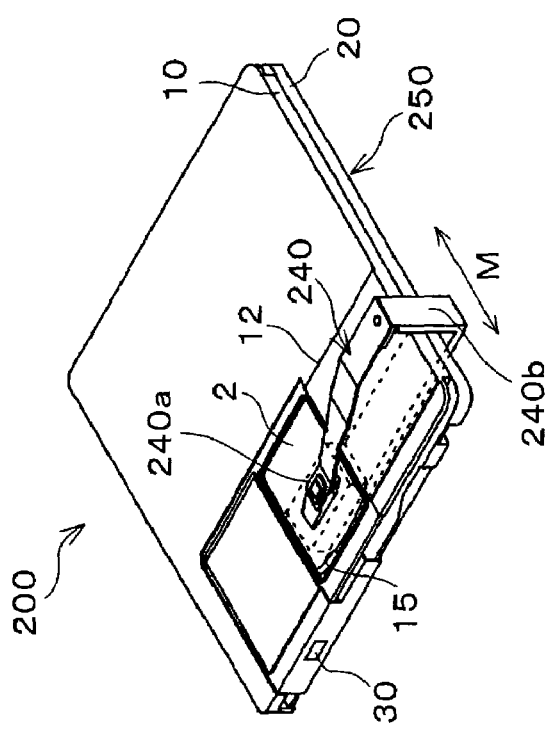
FIG. 13 (a)
FIG. 13 (b)

DISC CARTRIDGE

FIELD OF THE INVENTION

The present invention relates to a disc cartridge for containing therein a disc-like shaped recording medium for recording and reproducing data.

BACKGROUND OF THE INVENTION

A disc cartridge is used to contain a disc-like shaped recording medium (hereinafter, referred to as a disc) such as optical discs or magnetic discs, for easy handling in mounting the disc in a recording/reproducing apparatus, and for dust control. The disc cartridge is provided with an opening so that in recording or reproducing data, the disc is accessible to a recording/reproducing head, such as a magnetic head, and a turn table for rotating the disc, of the recording/reproducing apparatus. For preventing dust and the like from coming inside of the cartridge through the opening to reach the disc, the opening is generally provided with a shutter capable of arbitrarily opening and closing.

Specifically, when the disc cartridge is loaded in the recording/reproducing apparatus, the disc cartridge exposes part of the disc via the opening, so as to allow reproduction of data stored on the disc, and recording of data onto the disc. On the other hand, when the disc cartridge is not loaded in the recording/reproducing apparatus, the shutter is closed to cover the opening, thereby protecting the disc from dust and the like.

For example, a disc cartridge containing a magneto-optical disc therein is known as this kind of disc cartridge having such a shutter. Recording and Reproduction of magneto-optical discs use a magnet head and an optical head of a recording/reproducing apparatus. Discussed below is a disc cartridge containing a magnet optical disc of 86 mm diameter, referring to FIGS. 8 to 12.

As shown in FIG. 9, a disc cartridge 61 (see FIGS. 8(*a*) and 8(*b*)) contains a magnet-optical disc (hereinafter, a disc) 62 in an interior space of a cartridge main body constituted by combining an upper half 70 and a lower half 80. The disc 62 is capable of rotating arbitrarily in the interior space of the cartridge main body. Further, in the cartridge main body, a shutter 90, which is capable of opening and closing arbitrarily as described above, is provided to openings 75 and 85, which are provided for writing and reading a data signal into/from the disc 62 (hereinafter, this operation is just referred to as recording and reproduction of data).

The shutter 90 is, as shown in FIG. 9, attached to a shutter slider 95, which slides along side sections of the upper and lower halves 70 and 80, and is capable of sliding on the cartridge main body by using a shutter holding plate 89 provided on the lower half 80. The shutter 90 moves in synchronism with movement of the shutter slider 95, so as to open or close the openings 75 and 85.

Moreover, as shown in FIGS. 8(*a*) and 8(*b*), a shutter spring 99 (see FIG. 9) is provided between an end of the shutter slider 95 and the cartridge main body, in order to realize movement of the shutter slider 95 along the side sections of the upper and lower halves 70 and 80. By utilizing extension and contraction of the shutter sprig 99, the shutter slider 95 slides along the side sections of the upper and lower halves 70 and 80, so as to slide the shutter 90 on the cartridge main body.

The opening 75 is, as shown in FIG. 9, provided on the upper half 70 of the disc cartridge 61 so that the magnetic head of the recording/reproducing apparatus can access to the disc 62. Meanwhile, the opening 85 is provided on the lower half 80 so that the optical head and the turn table can access to the disc 62. In addition, the disc cartridge 61 is provided with a light protector 63 for prevention of erroneous deletion of data stored in the disc 62 in reproducing the disc 62.

The disc cartridge 61 having the above arrangement performs opening and closing operation as follows.

In the disc cartridge 61, when the shutter spring 99 (see FIG. 9) is substantially straightly extended, the shutter 90 covers the openings 75 and 85, as shown in FIGS. 8(*a*) and 10, thereby closing the openings 75 and 85. On the other hand, when the openings 75 and 85 are opened so that part of the disc 62 is exposed via the openings 75 and 85, the shutter spring 99 is folded into a substantially V-like shape. This causes the shutter 90 to slide in synchronism with the shutter slider 95, so as to expose the disc 62 via the openings 75 and 85. Then, by using the magnetic head and the optical head, the recording and reproduction of data are carried out on that part of a signal recording surface of the disc 62 that is exposed through the openings 75 and 85.

Meanwhile, Japanese Publication of Unexamined Patent Application, Tokukai, No. 2000-30396 (published on Jan. 28, 2000), as shown in FIGS. 11(*a*) and 11(*b*), discloses a disc cartridge 101 including an opening 115 provided with two shutters 110*a* and 110*b*, which open and close by rotation. In the disc cartridge 101, as shown in FIG. 12, a lower half 103 of a cartridge main body is provided with a recess section 103*a* through which the two shutters 110*a* and 110*b* slide. Further, a lower half cover 104 is provided so that the shutters 110*a* and 110*b* are held in the recess section 103*a*.

Furthermore, the shutter 110*a*, as shown in FIGS. 11(*a*) and 12, is provided with a canopy section 110*x* in a vicinity of a side surface against which the shutter 110*b* will abut. Thus, the canopy section 110*x* of the shutter 110*a* overlaps on the shutter 110*b*, when the shutters 110*a* and 110*b* close.

In the disc cartridge having the above arrangement, by sliding the shutters 110*a* and 110*b* through the recess section 103*a*, the shutters 110*a* and 110*b* are opened and closed by rotation. When the shutters 110*a* and 110*b* open, the shutters 110*a* and 110*b* move apart from each other as shown in FIG. 11(*b*), thereby exposing part of a disc 102 via the opening 115.

On the contrary, when the two shutters 110*a* and 110*b* close, the two shutters 110*a* and 110*b* abut against each other as shown in FIG. 11(*a*), thereby covering the opening 115. Here, as shown in FIG. 12, the canopy section 110*x* provided on the shutter 110*a* covers an area where the shutters 110*a* and 110*b* abut against each other. This arrangement prevents invasion of dust through a gap in the area where the shutters 110*a* and 110*b* abut against each other when the shutters 110*a* and 110*b* close.

As described above, the opening and closing of the shutter 90 of the disc cartridge 61, and those of the shutters 110*a* and 110*b* of the disc cartridge 90 are respectively performed by sliding the shutters along the cartridge main bodies.

For smooth opening and closing of the shutter 90, the disc cartridge 61 is provided with gaps β between the shutter 90 and the upper and lower halves 70 and 80, respectively, as shown in FIG. 10. If the shutter 90 and the upper and lower halves 70 and 80 were in full contact, a large friction would be caused therebetween. This friction would lead to difficulty in sliding the shutter 90 thereby failing to attain the smooth opening and closing. Moreover, the upper and lower halves 70 and 80 should have a satisfactorily flat surface in order to let the shutter 90 to slide thereon where the shutter 90 and the upper and lower halves 70 and 80 are in full contact. Therefore, in the disc cartridge 61, the smooth opening and closing the shutter 90 are realized by providing the quite small gaps β between the shutter 90 and the upper and lower halves 70 and 80, respectively.

Moreover, in the disc cartridge 101, as shown in FIG. 12, gaps γ are provided between the lower halve 103 and the shutters 110a and 110b, thereby enabling smooth opening and closing of the shutters 110a and 110b.

However, in the conventional disc cartridge 61, which is, as shown in FIG. 10, provided with the quite small gaps β respectively between the shutter 90 and the upper and lower halves 70 and 80, there is a risk that dust and the like would invade into the cartridge 61 and reach the disc 62 via the gaps β and the openings 75 and 85. Furthermore, there is a risk that the sliding of the shutter 90 along the upper and lower halves 70 and 80 causes friction respectively at an edge section 75a of the opening 75 and art edge section 85a of the opening 85, thereby producing friction powder. There is a possibility that the friction powder could pass through the openings 75 and 85 so as to attach onto the surface of the disc 62. Dust, powder and the like attached onto the surface of the disc 62 may cause troubles in recording and reproducing, thereby leading to failure in recording and reproducing data.

On the other hand, the disc cartridge 101 disclosed in Tokukai No. 2000-30396 is provided with the shutters 110a and 110b (FIG. 12) between the recess section 103a provided in the lower half 103 and the lower half cover 104, as described above. Because the recess section 103a and the lower half cover 104 are provided, it is expected that the dust that goes through the gaps γ between the lower half 103 and the shutters 110a and 110b, and reaches the disc 102 via the opening 115 is in much smaller quantity, compared with the disc cartridge 61 (FIG. 10). However, in sliding the shutters 110a and 110b along the recess section 103, friction may occur at an edge section 115a of the opening 115, thereby producing friction powder. The friction powder may reach the disc 102 via the opening 115 and attach onto the surface of the disc 102, as in the disc cartridge 61 shown in FIG. 10, and may hinder the recording and reproduction.

Further, Japanese Publication of Unexamined Patent Application, Tokukai, No. 2001-126432 (published on May 11, 2001) discloses a disc cartridge provided with a rib in a vicinity of a head inserting inlet (through which a head is inserted), which corresponds to the openings. A shutter slides on the rib. In this publication, a contact surface between the shutter and rib is reduced so as to reduce the occurrence of the production of friction powder due to friction between the shutter and the rib; nevertheless, it is difficult to prevent the occurrence of the production of friction powder. In short, in the disc cartridge of the publication, it is inevitable that the friction powder is produced due to the sliding of the shutter along the rib, and the resultant friction powder passes through the head inserting inlet and to attach onto the surface of the disc.

SUMMARY OF THE INVENTION

The present invention, in view of the foregoing problems in the prior arts, has an object to provide a disc cartridge for protecting, from dust and friction powder, a disc contained inside the disc cartridge, and being excellent in dust control.

In order to solve the aforementioned problems, a disc cartridge of the present invention is provided with an opening, provided in a cartridge main body for containing a disc-like shaped recording medium in such a manner that the recording medium is allowed to rotate inside the cartridge main body, for exposing part of the recording medium; a shutter for opening and closing the opening, the shutter having a shielding section for covering the opening when the shutter is closed, and a sliding section for sliding on a shutter sliding surface of the cartridge main body during opening and closing operation; and a protrusion section, provided in at least part of a periphery of the opening on the shutter sliding surface, the protrusion section being covered by the shielding section when the shutter is closed.

With the above arrangement, the opening is at least partially surrounded by the protrusion section. Therefore, the protrusion section functions as a barrier when dust and grime go in a gap between the sliding section and the shutter sliding surface, thereby preventing the dust and grime from reaching the recording medium via the opening. Moreover, even if, during the opening and closing of the shutter, friction is caused because the sliding section touches the shutter sliding surface, the protrusion section, which acts as a barrier, prevents friction powder from reaching the recording medium via the opening.

Further, the shutter is provided with the shielding section, which covers the opening surrounded by the protrusion section, and the sliding section. Because of this, the shielding section covers the protrusion section and the opening, and the sliding section slides on the shutter sliding surface, whereby the protrusion section, which is provided in the whole or part of the periphery of the opening, will not hinder the opening and closing operations of the shutter. Thus, it is possible to smoothly and freely open and close the shutter.

This provides a disc cartridge capable of smoothly opening and closing the shutter, and excellent in dust control for preventing the dust, grime, and friction powder from reaching the recording medium. Further, because the dust, grime, and the friction powder that could attach to a surface of the recording medium are reduced, this attains appropriate recording/reproducing of the recording medium. Thereby, it is possible to provide a disc cartridge having high reliability.

Moreover, the disc cartridge may be so preferably arranged that the shutter is so provided as to have a space between (i) that surface of the shielding section which is in parallel to the shutter sliding surface, and (ii) a top section of the protrusion section.

With the above arrangement, because there is a space between (i) that surface of the shielding section (hereinafter, referred to as a facing surface of the shielding section) which is substantially in parallel to the shutter sliding surface, and (ii) the top section of the protrusion section, the shielding section and the top section of the protrusion section will not touch each other during the opening and closing the shutter. Therefore, no friction will be caused between the facing surface of the shielding section and the top section of the protrusion section, and no friction powder reaches the recoding medium via the opening.

Namely, in the disc cartridge of the present invention, it is not only possible to prevent the friction powder produced because the shielding section touches the shutter sliding section from entering the opening, but it also is possible to prevent the friction powder from being produced due to the touching of the shielding section and the top section of the protrusion section. This provides a disc cartridge capable of performing the recording/reproducing of the recording medium with high reliability.

For a fuller understanding of the nature and advantages of the invention, reference should be made to the ensuing detailed description taken in conjunction with the accompanying drawings.

BRIEF DESCRIPTION OF THE DRAWINGS

FIG. 8(a) is a perspective view illustrating a conventional disc cartridge when a shutter is closed, while FIG. 8(b) is a perspective view showing the conventional disc cartridge when the shutter is opened.

FIG. 11(a) is a schematic view illustrating another conventional disc cartridge when a shutter is closed, while FIG. 11(b) is a schematic view showing the another conventional disc cartridge when the shutter is opened.

FIG. 13(a) is a perspective view illustrating that a recoding/reproducing head is inserted in a disc cartridge, while FIG. 13(b) is a perspective view illustrating a disc cartridge of a yet another embodiment of the present invention, which has a notch section, the perspective view 13(b) showing that a recording/reproducing head is inserted in the disc cartridge.

FIG. 14(a) is a perspective view illustrating an upper half side of the disc cartridge shown in FIG. 13(b), while FIG. 14(b) is a perspective view illustrating an lower half side of the same.

FIG. 15(a) is a perspective view illustrating an upper half side of a disc cartridge of a still yet another embodiment of the present invention, while FIG. 15(b) is a perspective view illustrating a lower half side of the same.

DESCRIPTION OF THE EMBODIMENTS

Described below are embodiments of the present invention, referring to FIGS. 1 to 7, and 13 to 15.

Figure 2:
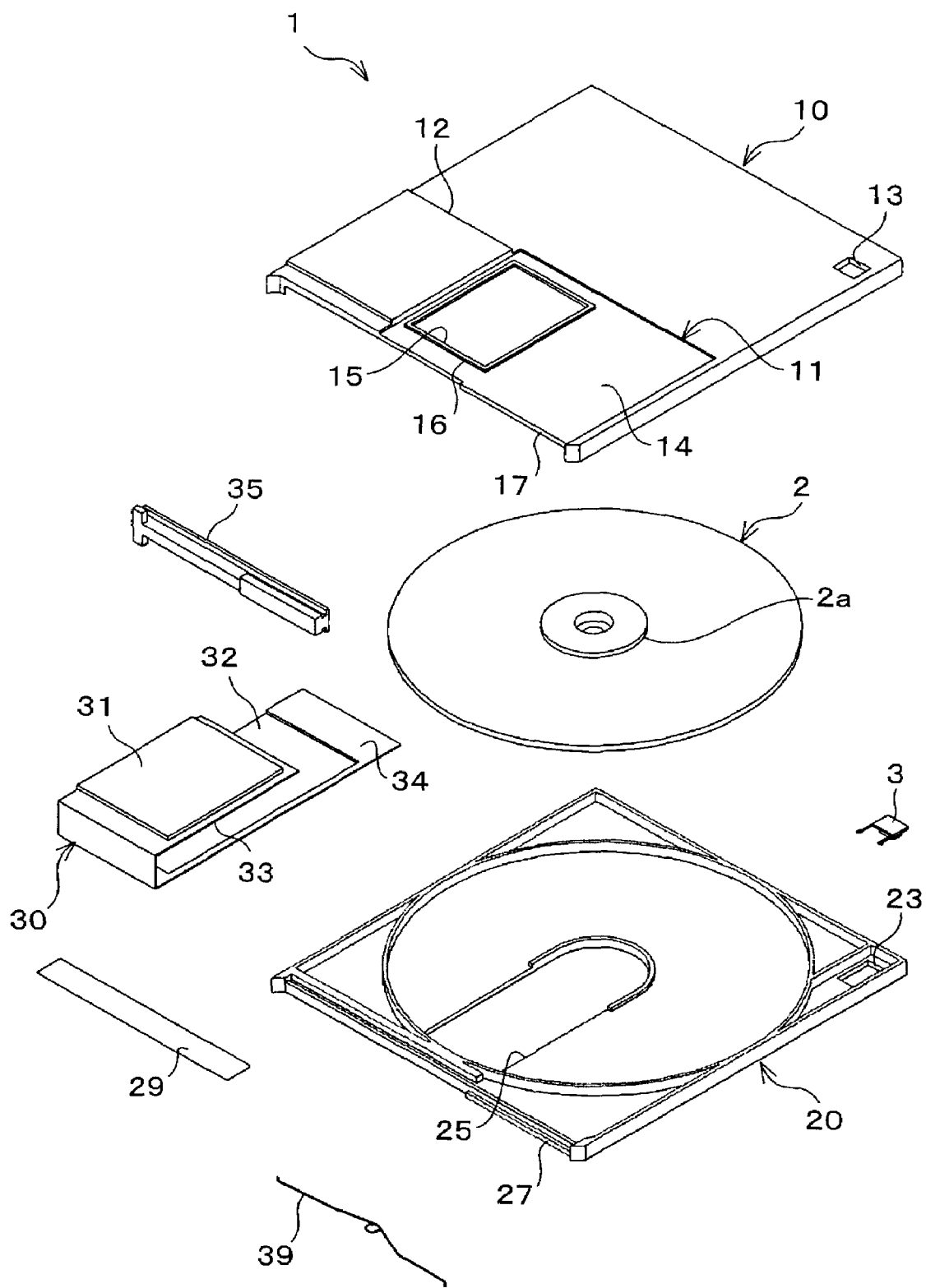
FIG. 2 is an exploded perspective view of a disc cartridge of an embodiment of the present invention.

A disc cartridge 1 of one of the embodiments is provided with a disc-like shaped magneto-optical disc (hereinafter, referred to as a disc) 2, a light protector 3, a substantially box-like shaped cartridge main body, which is structured by combining an upper half 10 and a lower half 20 (hereinafter referred to as upper and lower halves 10 and 20), and a shutter 30, as shown in FIG. 2. Further, a disc 2 is contained in disc containing sections provided respectively on the upper and lower halves 10 and 20. The disc containing sections have a round shape. The disc 2 is so contained that the disc 2 can freely rotate in a cirumferential direction.

The disc 2 is made mainly of polycarbonate for example. In the disc 2, which is a magneto-optical disc, a magnetic head and an optical head of a recording/reproducing apparatus are used for writing/reading a data signal in/out of a signal recording surface of the disc 2 (hereinafter, the writing/reading of a data signal are referred to as recording/reproducing of data).

The light protector 3 is provided in order to prevent, in reproducing the data stored in the signal recording surface of the disc 2, erroneous deletion of data.

The upper and lower halves 10 and 20 are made of polycarbonate or the like, for example. The cartridge main body is formed by combining the upper and lower halves 10 and 20, as shown in FIGS. 3(a) and 3(b), so as to contain the disc 2 in a space inside the cartridge main body. Further, the upper and lower halves 10 and 20 are respectively provided with openings 15 and 25, which are for exposing part of the disc 2, (see FIG. 2) thereby enabling recording/reproducing of data in/from the disc 2. Details of this arrangement will be discussed later. Hereinafter, in each upper and lower halve 10 and 20, a surface that is to contain the disc 2 is referred to as an interior surface, and a surface that is a back face of the interior surface is referred to as an exterior surface.

The upper half 10 is, as shown in FIG. 2, provided with, on the exterior surface thereof, a recess section 11, a plateau (plateau section) 12, and a light protector hole section 13. The recess portion 11 and the plateau 12 are provided along a side surface section 17.

In the recess section 11, a shutter sliding surface 14, the opening 15 having a quadrangular shape, and a protrusion section 16 are provided. The protrusion section 16 surrounds the opening 15 on the exterior surface of the upper half 10. In the shutter sliding surface 14, which is part of the exterior surface of the upper half 10, a shutter 30 later described slides. The opening 15 is an inlet for a magnetic head of the recording/reproducing apparatus. Via the opening 15, the magnetic head approaches the disc 2.

The protrusion section 16, together with the opening 15, is covered with the later-described shutter 30. The protrusion section 16 is protruded beyond the shutter sliding surface 11. The protrusion section 16 is not limited to a particular cross sectional shape, and may have a quadrangular shape, a semi-circular shape, a triangular shape, and the like shape. In addition, the protrusion section 16 has such a height as to be between (i) the exterior surface of the upper half or a later-described top surface of the plateau 12, and (ii) the shutter sliding surface 11 (that is, the protrusion section 16 has such a height less than or equal to a difference between (i) a level of the surface of the upper half 10 or the top surface of the plateau 12, and (ii) that of the shutter sliding surface). Further the height of the protrusion section 16 is such that an upper surface (top section) 16a of the protrusion section 16 does not touch the later-described shutter 30.

Figure 1:
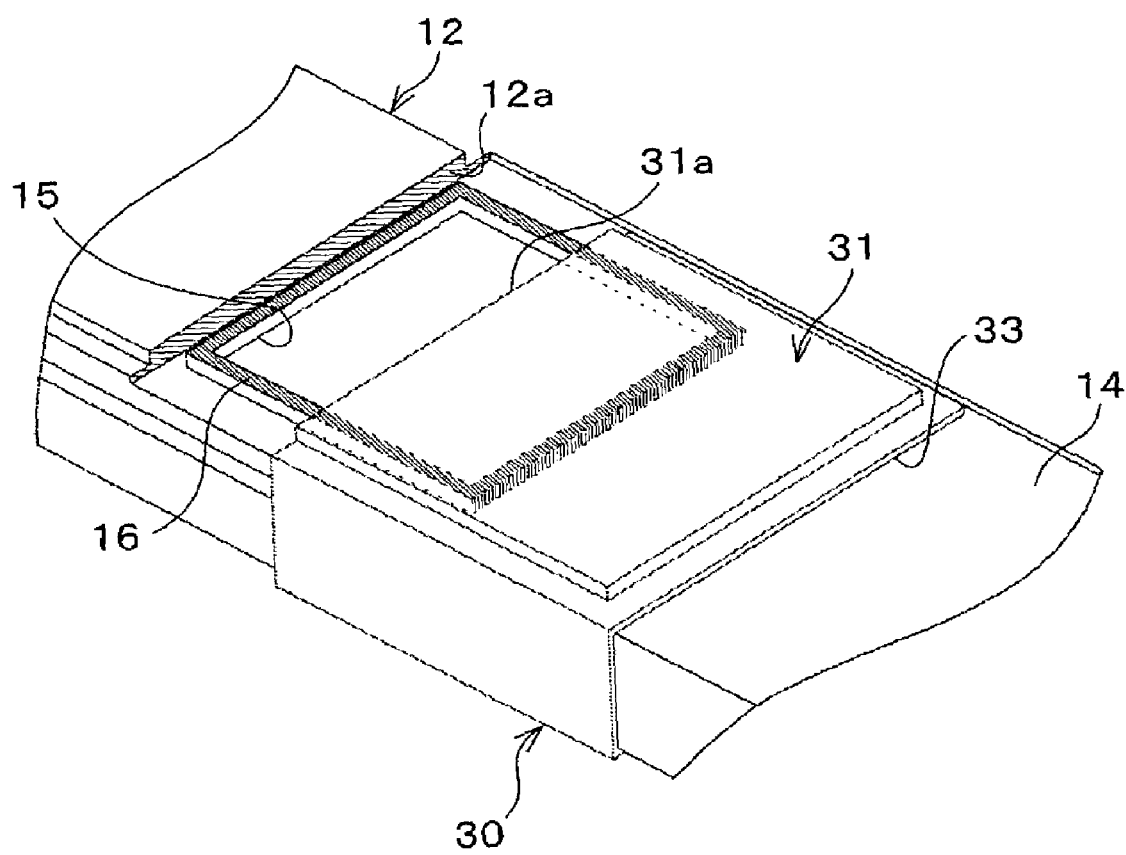
FIG. 1 is a perspective view illustrating a vicinity of an opening of a disc cartridge of the present invention.

The plateau 12 protrudes (sticks) out of the exterior surface of the upper half 10. As shown in FIG. 1, sides of the plateau 12 are shaped to match with those of the shutter 30, because a shutter abutting surface 12a of the plateau 12 is to be abutted by an abutting surface 31a of the shutter 30 later described. With this arrangement in which the plateau 12 is provided so as to enable the shutter 30 to be pressed on the shutter abutting surface 12a of the plateau 12, it is possible to close the shutter 30 by keeping the shutter 30 in a predetermined position, as described later.

The light protector hole 13 (see FIG. 2) is a hole through which the recording/reproducing apparatus judges where the light protector 3 is positioned. In accordance with where the light protector 3 is positioned, the recording of data onto the disc 2 is controlled.

Moreover, the lower half 20 is provided with, on the exterior surfaces thereof, a recess section 21 shown in FIG.

Figure 4:
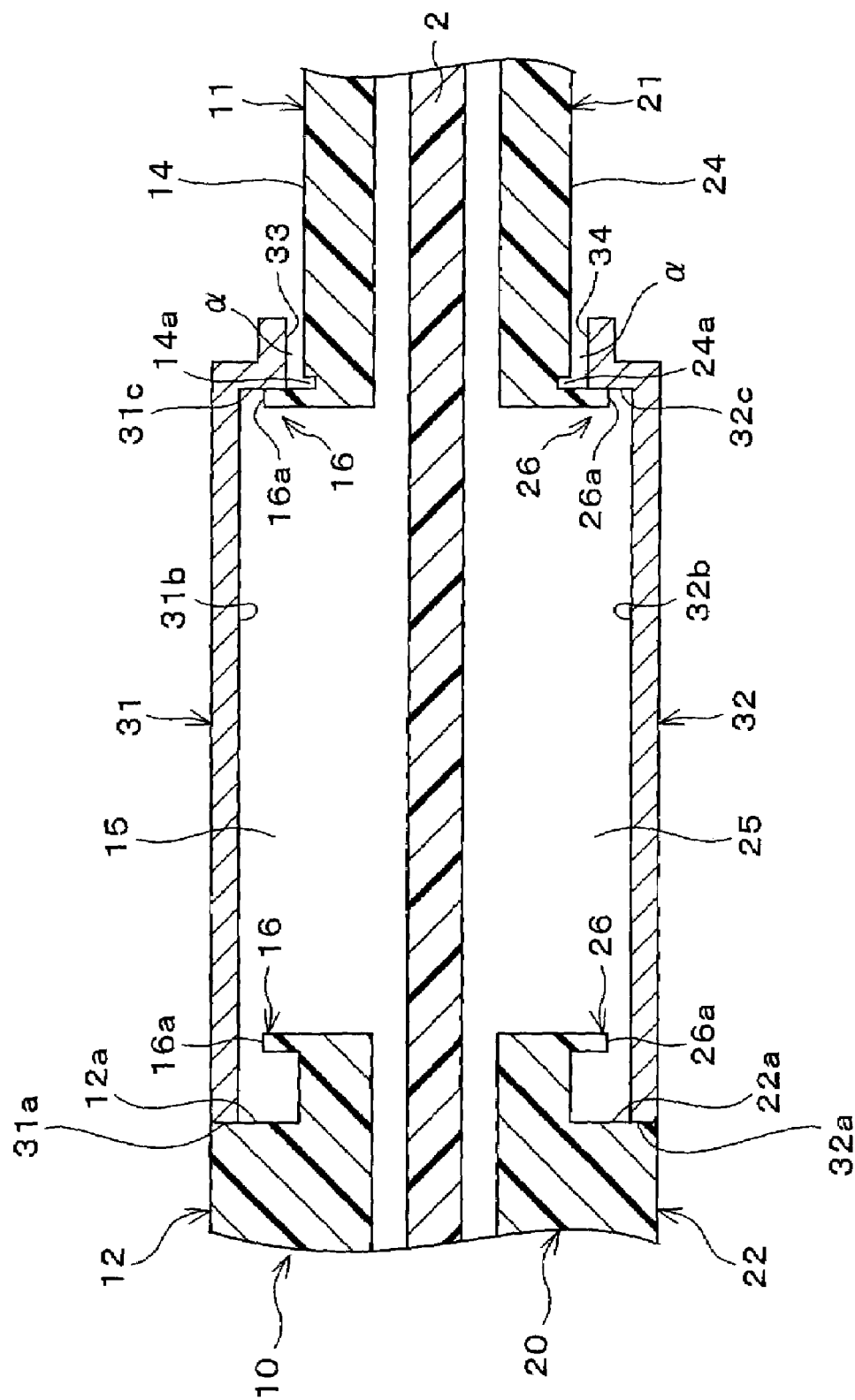
FIG. 4 is a sectional view taken on line A-A' of the disc cartridge shown in FIG. 3(a).

4, a plateau (plateau section) 22 shown in FIG. 4, and a light protector sliding hole section 23 shown in FIG. 2, and a shutter-stopping plate 29 shown in FIG. 2. The recess section 21 and the plateau 22 are positioned along a side section 27 (see FIG. 2).

Figure 5:
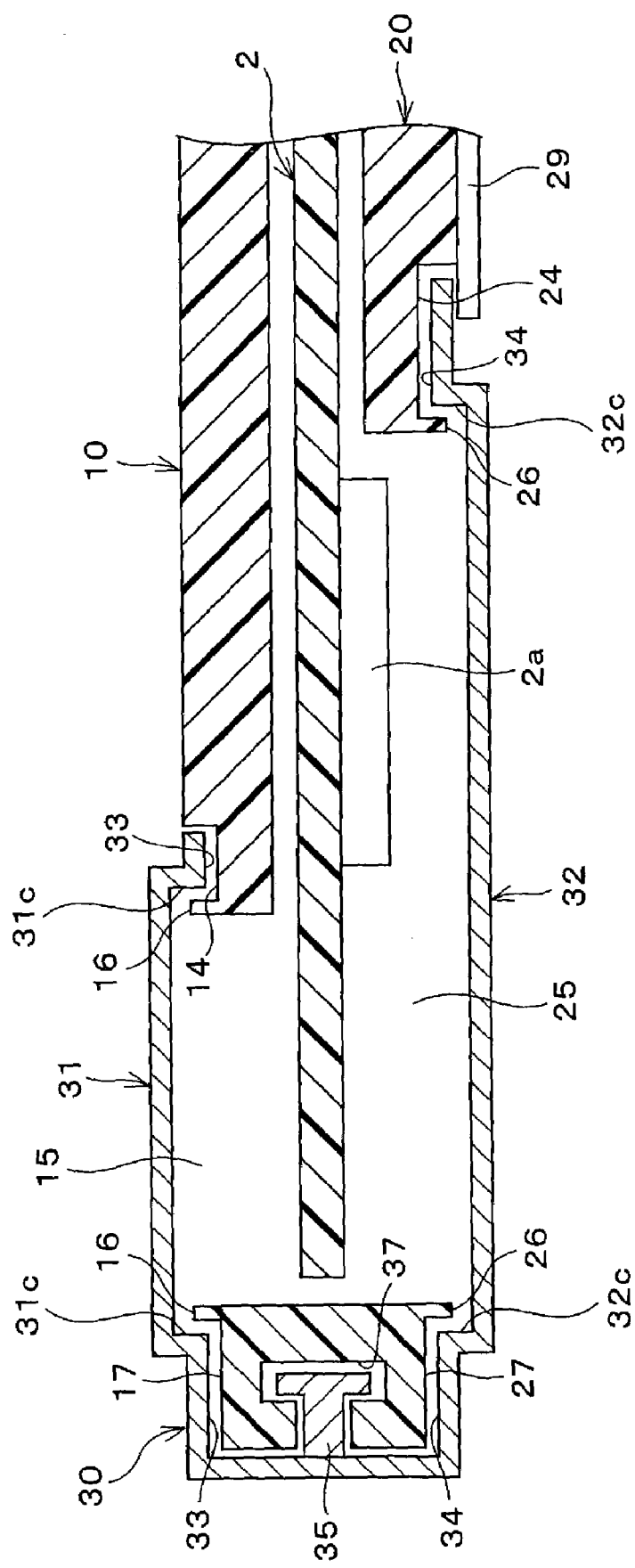
FIG. 5 is a sectional view taken on line B-B' of the disc cartridge shown in FIG. 3(a).

In the recess section 21, as shown in FIGS. 4 and 5, a shutter sliding surface 24, an opening 25, and a protrusion section 26 are provided. The opening 25 opens from a central hole section 2a of the disc 2 to a vicinity of the side section 27 of the lower half 20. The protrusion section 26 is so provided as to surround the opening 25 on the exterior surface of the lower half 20. On the shutter sliding surface 24, the later-described shutter 30 slides.

The opening 25 is provided so that an optical head and a turn table of the recording/reproducing apparatus approach the disc 2, the turn table having a magnet for rotating the disc 2. Specifically, as shown in FIG. 5, the turn table of the recording/reproducing apparatus moves into that part of the opening 25 that corresponds to a vicinity of the central hole section 2a of the disc 2, and rotates the disc 2. Meanwhile, the optical head moves into that part of the opening 25 that corresponds to the vicinity of the side section 27, which is next to the part of the opening 25 that corresponds to the central hole section 2a.

The protrusion section 26, together with the opening 25, is covered with the later-described shutter 30, similarly to the protrusion section 16, protrudes beyond the shutter sliding surface 24. Again, a sectional shape of the protrusion section 26 is not particularly limited, similarly to the protrusion section 16. In addition, the protrusion section 26 has such a height as to be between (i) the exterior surface of the lower half 20 or a later-described top surface of the plateau 22, and (ii) and the shutter sliding surface 24 (that is, the protrusion section 26 has such a height less than or equal to a difference between (i) a level of the surface of the lower half 20 or the top surface of the plateau 22, and (ii) that of the shutter sliding surface). Further the height of the protrusion section 26 is such that an upper surface (top section) 26a of the protrusion section 26 does not touch the later-described shutter 30.

The plateau 22 protrudes beyond the exterior surface of the lower half 20. As shown in FIG. 4, sides of the plateau 22 are shaped to match with those of the shutter 30, because a shutter abutting surface 22a of the plateau 22 is to be abutted by an abutting surface 32a of the shutter 30 later described. With this arrangement in which the plateau 22 is provided so as to enable the shutter 30 to be pressed on the shutter abutting surface 22a of the plateau 22, it is possible to close the shutter 30 by keeping the shutter 30 in a predetermined position, as described later.

The light protector sliding hole section 23 (see FIG. 2) is so located as to correspond to the light protector sliding hole section 13 in terms of position, when the upper and lower halves 10 and 20 are combined. The light protector sliding hole section 23 enables the light protector 3 to slide. In accordance with where the light protector 3 is positioned, the writing of data in the disc 2 is controlled.

The shutter-stopping plate 29 is, as shown in FIG. 5, positioned, in parallel with the side section 27, in a boundary area between the shutter sliding surface 24 and the exterior surface of the lower half 20. One end of the later-described shutter 30 is inserted between the shutter-stopping plate 29 and the shutter sliding surface 24. This enables the shutter 30 to slide on the shutter sliding surface 24.

Moreover, the shutter 30 shown in FIG. 2 is made of a stainless material, for example. The shutter 30 is provided for opening and closing the openings 15 and 25 of the upper and lower halves 10 and 20, and slides on the shutter sliding surfaces 14 and 24. Note that, hereinafter, the state in which the shutter 30 covers and closes the openings 15 and 25 will be referred to as a closing state (FIG. 3(a)), while the state in which the shutter 30 does not cover and opens the openings 15 and 25 will be referred to as an opening state (FIG. 3(b)).

The shutter 30, as shown in FIG. 2, has a substantially U-like shape, and is provided with a shutter slider 35 made of a stainless material or the like, in order to be able to slide on the shutter sliding surfaces 14 and 24. Specifically, as shown in FIG. 5, the shutter 30 is so provided as to sandwich the upper and lower halves 10 and 20. The shutter slider 35 is provided between the shutter 30 and the side of the cartridge main body. In other words, the shutter slider 35 is so attached as to be inserted in a groove 37 surrounded by the side surface sections 17 and 27. The groove 37 is formed by combining the upper and lower halves 10 and 20 together. The sliding of the shutter slider 35 along the groove 37 slides the shutter 30 on the shutter sliding surfaces 14 and 24.

For the opening and closing operation of the shutter 30 by sliding the shutter slider 35 as described above, the shutter slider 35 is provided with, on one end thereof, a shutter spring 39 (see FIG. 2). The shutter spring 39 is located inside the cartridge main body formed by combining the upper and lower halves 10 and 20. In other words, one end of the shutter spring 39 is attached to the one end of the shutter slider 35, while the other end of the shutter spring 39 is attached to an interior side of the cartridge main body. The shutter spring 39 is extended and contracted between the one end of the shutter slider 35 and the cartridge main body, in accordance with the sliding of the shutter slider 35.

The shutter 30 is, as shown in FIG. 4, provided with shielding sections 31 and 32, and sliding surfaces 33 and 34 as sliding sections for sliding on the shutter sliding surfaces 14 and 24. The shielding section 31 and the sliding surface 33 are provided on that side of the shutter 30 that slides on the shutter sliding surface 14 of the upper half 10. Meanwhile, the shielding section 32 and the sliding surface 34 are provided on that side of the shutter 30 which slides on the shutter sliding surface 24 of the lower half 20.

The shielding sections 31 and 32 have, as shown in FIG. 2, such a protrusion shape as to cover, when the shutter 30 is in the closing state, the openings 15 and 25, and the protrusion sections 16 and 26, which are respectively located around the openings 15 and 25. Moreover, as shown in FIG. 4, the shielding sections 31 and 32 respectively have a height substantially equal to those of the plateaus 12 and 22 provided on the upper and lower halves 10 and 20. The upper and lower halves 10 and 20 respectively have facing surfaces 31b and 32b, which respectively face the upper and lower halves 10 and 20. Between the facing surface 31b and a protrusion top surface 16a of the protrusion section 16, and between the facing surface 32b and a protrusion top surface 26a of the protrusion section 26, spaces are formed.

Moreover, the shielding sections 31 and 32 have a size large enough to cover, when the shutter 30 is in the closing state, the openings 15 and 25, and the protrusion sections 16 and 26 respectively located around (in peripheries of) the openings 15 and 25, of the upper and lower halves 10 and 20 (see FIGS. 4 and 5). Specifically, the shielding sections 31 and 32 have such a size that (i) abutting surfaces 31a and 32a of the shielding sections 31 and 32 respectively abut against the shutter abutting surfaces 12a and 22a of the plateaus 12 and 22 of the upper and lower halves 10 and 20, and (ii) interior surfaces 31c and 32c of the shielding sections 31 and 32 respectively abut side surfaces (touching sections) of the protrusion sections 16 and 26 located opposite to the plateaus 12 and 22, as shown in FIG. 4, when the shutter 30 is in the closing state.

Note that the interior surfaces 31c and 32c of the shielding sections 31 and 32 do not need to abut the protrusion sections 16 and 26. As long as the shielding sections 31 and 32 cover the openings 15 and 25, and the protrusion sections 16 and 26 respectively located around the openings 15 and 25, it may be so arranged that there is a space between the interior surface 31c and the side surface of the protrusion section 16, and between the interior surface 32c and the side surface of the protrusion section 26. Likewise, the side surfaces of the protrusion sections 16 and 26 located in positions other than the opposite sides of the plateaus 12 and 22 as shown in FIG. 5 may be so arranged that the side surfaces of the protrusion sections 16 and 26 respectively touch the interior surfaces 31c and 32c of the shielding sections 31 and 32, or may be so arranged that there are spaces between the interior surface 31c of the shielding section 31 and the side surface of the protrusion section 16, and between the interior surface 32c of the shielding section 32 and the side surface of the protrusion section 26.

The sliding surfaces 33 and 34 are, as shown in FIGS. 4 and 5, provided respectively on sides facing the shutter sliding surfaces 14 and 24 of the upper and lower halves 10 and 20, so as to slide on the shutter sliding surfaces 14 and 24. The sliding surfaces 33 and 34 are provided in such positions that the sliding surfaces 33 and 34 will not cover the openings 15 and 25 and the protrusion sections 16 and 26 respectively located around the openings 15 and 25 in moving the shutter 30 to open and close. Usually, the sliding surfaces 33 and 34 are located to surround the shielding sections 31 and 32 (see FIG. 2).

The shutter 30 is opened and closed by sliding the sliding surfaces 33 and 34 on the shutter sliding surfaces 14 and 24. For smooth sliding of the sliding surfaces 33 and 34, the sliding surfaces 33 and 34, and the shutter sliding surfaces 14 and 24 are not fully in contact, but are located with gaps a therebetween as shown in FIG. 4. In short, friction between the sliding surfaces 33 and 34, and the shutter sliding surfaces 14 and 24 is reduced by providing the gaps a therebetween, thereby realizing smooth opening and closing of the shutter 30. Moreover, this allows the shutter 30 to open and close smoothly even if the sliding surfaces 33 and 34 and the shutter sliding surfaces 14 and 24 have a slightly rough surface, which is caused during production.

As described above, the shutter 30 has such arrangement that the sliding surfaces 33 and 34 slide on the shutter sliding surfaces 14 and 24, and the shielding sections 31 and 32 do not touch with the protrusion top surface 16a of the protrusion section 16, and the shutter sliding surfaces 14 and 24. In other words, when the shutter 30 is in the opening state, the sliding surfaces 33 and 34 are close to the shutter sliding surfaces 14 and 24, rather than to the shielding sections 31 and 32. That is, there are spaces between the shielding section 31 and the sliding surface 33, and between the shielding section 32 and the sliding surface 34. Thus, as shown in FIG. 1, the shielding sections 31 and 32 can cover the openings 15 and 25 and the protrusion sections 16 and 26 without touching the protrusion sections 16 and 26 during the opening and closing operations of the shutter 30.

As described above, the protrusion sections 16 and 26 are formed around the openings 15 and 25 of the upper and lower halves 10 and 20. With this arrangement, even if dust or grime goes into the gaps a shown in FIG. 4 from outside, the protrusion sections 16 and 26 work as shields to prevent the dust and grime from entering the openings 15 and 25.

Therefore, it is possible to prevent the dust and powder from reaching the surface the disc 2 via the openings 15 and 25 from outside. This reduces failure of recording and reproduction in the disc 2.

Especially, as shown in FIG. 4, the arrangement in which the interior surfaces 31c and 32c respectively abut against the side surfaces of the protrusion sections 16 and 26 when the shutter 30 is closed provides better prevention of the entering of the dust and grime into the openings 15 and 25 because no spaces are formed between the interior surface 31c and the side surface of the protrusion section 16, and between the interior surface 32c and the side surface of the protrusion section 26. This arrangement further improves dust control of the disc cartridge 1.

Next, the opening and closing operations of the shutter 30 of the disc cartridge 1 having the above arrangement.

The disc cartridge 1 is usually in the closing state, as shown in FIG. 3(a), with the shutter 30 covering the openings 15 and 25 and thus shielding the disc 2 contained in the cartridge main body. That is, usually the shutter spring 39 shown in FIG. 2 is substantially linearly extended so as to cause the shutter 30 to cover the openings 15 and 25, that is, to push the shutter 30 and the shutter slider 35 to predetermined positions.

That is, here, the abutting surfaces 31a and 32a of the shielding sections 31 and 32 of the shutter 30 respectively abut against the shutter abutting surfaces 12a and 22a of the plateaus 12 and 22 as shown in FIG. 4. Moreover, the interior surfaces 31c and 32c of the shielding sections 31 and 32 respectively abut the side surfaces of the protrusion sections 16 and 26 located opposite to the plateaus 12 and 22. Therefore, it is possible to keep the shutter 30 in a position at which the shutter 30 covers the openings 15 and 25 as shown in FIG. 3(a), without moving the shutter 30 to a position above the plateaus 12 and 22. Thus, it is possible to stably locate the shutter 30 above the openings 15 and 25 thereby closing the shutter 30 (having the shutter 30 in the closing state).

When the shutter 30 is in the closing state, as described above, the shielding sections 31 and 32 do not respectively touch the protrusion top surfaces 16a and 26a of the protrusion sections 16 and 26 around the openings 15 and 25 (see FIG. 4).

On the other hand, a force (external force) from outside is applied to the shutter slider 35. By this force, the shutter slider 35 is moved oppositely to the plateaus 12 and 22 along the side surface sections 17 and 27 of the upper and lower halves 10 and 20. Here, as the shutter slider 35 moves, the shutter spring 39 shown in FIG. 2 is folded into a substantially V-like shape.

Moreover, as the shutter slider 35 moves, the shutter 30 slides on the shutter sliding surfaces 14 and 24, so as to move oppositely to the plateaus 12 and 22, as shown in FIG. 1. Here, the sliding surfaces 33 and 34 of the shutter 30 slide on the shutter sliding surfaces 14 and 24. Therefore, the shielding sections 31 and 32 having a protruded shape will never touch the protrusion top surfaces 16a and 26a, respectively. Such movement of the shutter 30 causes the opening state in which part of the disc 2 is exposed via the openings 15 and 25, as shown in FIG. 3(b).

Further, the shutter spring 39, which has been folded by the external force, pushes the shutter slider 35 toward to plateaus 12 and 22 by its spring force when the external force is removed. At the same time, the shutter 30 slides on the shutter sliding surfaces 14 and 24 so as to move toward the plateaus 12 and 22. Here, as shown in FIG. 1, the shielding sections 31 and 32 of the shutter 30, which have a protruded shape, moves without touching the protrusion top surfaces 16a and 26a of the protrusion sections 16 and 26, respectively.

Further, as shown in FIG. 4, the abutting surfaces 31a and 32a of the shielding sections 31 and 32 of the shutter 30 respectively abut against the shutter abutting surfaces 12a and 22a. Meanwhile, the interior surfaces 31c and 32c of the shielding sections 31 and 32 respectively abut against the side surfaces of the protrusion sections 16 and 26. With this arrangement, the openings 15 and 25, as shown in FIG. 3(a) are covered with the shutter 30, and closed again.

In the opening and closing operations of the shutter 30, as described above, the shutter 30 slides on the shutter sliding surfaces 14 and 24 of the upper and lower halves 10 and 20 in such a manner that the sliding surfaces 33 and 34, which are part of the shutter 30 in which the shielding sections 31 and 32 are not formed, slide respectively on the shutter sliding surfaces 14 and 24. As described above, the gaps a (see FIG. 4) are respectively provided between the sliding surface 33 and the shutter sliding surfaces 14, and between the sliding surface 34 and the shutter sliding surface 24. With this arrangement, the sliding surfaces 33 and 34 of the shutter 30 appropriately slide the shutter sliding surfaces 14 and 24 respectively, thereby smoothly opening and closing the shutter 30.

During the opening and closing operation of the shutter 30, the sliding of the sliding surfaces 33 and 34 on the shutter sliding surfaces 14 and 24 may produce friction powder. However, even if the friction powder is produced on the shutter sliding surfaces 14 and 24, the friction powder is prevented from entering the openings 15 and 25, because the protrusion sections 16 and 26 are provided around the openings 15 and 25, as shown in FIG. 4. This prevents the friction powder from attaching on the surface of the disc 2. Thus, it is possible to appropriately perform the recording and reproduction of data to/from the disc 2.

Moreover, as described above, there are spaces between the facing surface 31b of the shielding section 31 and the protrusion top surface 16a of the upper half 10, and between the facing surface 32b of the shielding section 32 and the protrusion top surface 26a of the lower half 20. With this arrangement, the facing surfaces 31b and 32b will never touch the protrusion top surfaces 16a and 26a, respectively, during the opening and closing operations of the shutter 30. Therefore, during the opening and closing operations of the shutter 30, the shielding sections 31 and 32 will not touch the protrusion top surfaces 16a and 16b respectively. Thus, no friction will occur therebetween, thus producing no friction powder.

Therefore, in the disc cartridge 1, it is possible to reduce the friction powder due to the opening and closing operations of the shutter 30, and prevent, from reaching the disc 2 via the openings 15 and 25, the friction powder produced between the sliding surface 33 and the shutter sliding surface 14 and between the sliding surface 34 and the shutter sliding surface 24. This improves dust control property of the disc cartridge 1, thereby causing the disc cartridge 1 to be more reliable.

Furthermore, as shown in FIG. 4, the shutter 30 is pushed against the side surfaces of the plateaus 12 and 22, and the side surfaces of the protrusion sections 16 and 26, by the shutter spring 39 (see FIG. 2) when the shutter 30 is closed. Specifically, as shown in FIG. 4, the abutting surfaces 31a and 32a of the shielding sections 31 and 32 are pushed against the shutter abutting surfaces 12a and 22a of the protrusion surfaces 12 and 22 of the upper and lower halves 10 and 20. Moreover, the interior surfaces 31c and 32c of the shielding sections 31 and 32 are pushed against the side surfaces of the protrusion sections 16 and 26 located oppositely to the plateaus 12 and 22.

Therefore, with this structure, when the shutter 30 is closed, it is possible to cause the abutting surfaces 31a and 32a of the shutter 30 to more closely touch (cohere to) the shutter abutting surfaces 12a and 22a of the plateaus 12 and 22. Further, with this structure, it is possible to cause the interior surfaces 31c and 32c of the shutter 30 to cohere to the side surfaces of the plateaus 16 and 26, when the shutter 30 is closed. Thus, with this structure, it is possible to further improve (i) the dust control at points of contact between the shutter abutting surfaces 12a and 22a and the abutting surfaces 31a and 32a, and (ii) the dust control at points of contact between the side surfaces of the protrusion sections 16 and 26 and the interior surfaces 31c and 32c.

Moreover, for better dust control, the side surfaces of the shutter abutting surfaces 12a and 22a, and of the protrusion sections 16 and 26 shown in FIG. 4 maybe made of an elastic material. With this arrangement, when the abutting surfaces 31a and 32a are pushed against the shutter abutting surfaces 12a and 22a by the shutter spring 39, the side surfaces of the protrusion sections 16 and 26 are deformed due to elasticity of the elastic material, of which the side surfaces are made. Therefore, it is possible to cause the abutting surfaces 31a and 32a to cohere to the shutter abutting surfaces 12a and 22a. Likewise, when the interior surfaces 31c and 32c of the shutter 30 are pushed against the side surfaces of the protrusion sections 16 and 26 by the shutter spring 39, the elasticity of the elastic material causes those sections to be cohered to each other. Therefore, it becomes easier to cause the abutting surfaces 31a and 32a of the shutter 30 and the shutter abutting surfaces 12a and 22a to cohere to each other. This further improves the dust control of the disc cartridge 1.

Further, as shown in FIG. 4, trap sections 14a and 24a may be provided, on the shutter sliding surfaces 14 and 24, in outer peripheries of the protrusion sections 16 and 26 located around the openings 15 and 25. This trap sections 14a and 24a traps therein the friction powder produced as a result of the sliding of the sliding surfaces 33 and 34 on the shutter sliding surfaces 14 and 24 during the opening and closing operations of the shutter 30. Moreover, the dust and grime from outside are also trapped in the trap sections 14a and 24a. This reduces the friction powder that reaches the surface of the disc 2 via the openings 15 and 25, thereby realizing appropriate recording and reproduction of data to/from the disc 2.

In the present embodiment, the upper and lower halves 10 and 20 are provided with the plateaus 12 and 22. However, the plateaus 12 and 22 may not be provided in the present invention. In this case, when the shutter 30 is closed, the shielding sections 31 and 32 of the shutter 30 are so arranged that the abutting surfaces 31a and 32a of the shielding sections 31 and 32 respectively abut side surfaces of the recess sections 11 and 21 of the upper and lower halves 10 and 20 (which are close to the plateaus 12 and 22). Again in this case, it is preferable that the protrusion sections 16 and 26 around the openings 15 and 25 have such height that the protrusion top surfaces 16a and 26a of the protrusion sections 16 and 26 do not touch the shielding sections 31 and 32, respectively.

Moreover, in the present embodiment, the protrusion sections 16 and 26 made of the same material as the upper and lower halves 10 and 20 are provided around the openings 15 and 25. However, as shown in FIG. 6, it may be arranged that protrusion sections 18 and 28 made of an elastic body having wear resistance, for example, brushes, electrified brushes, and the like.

Figure 6:
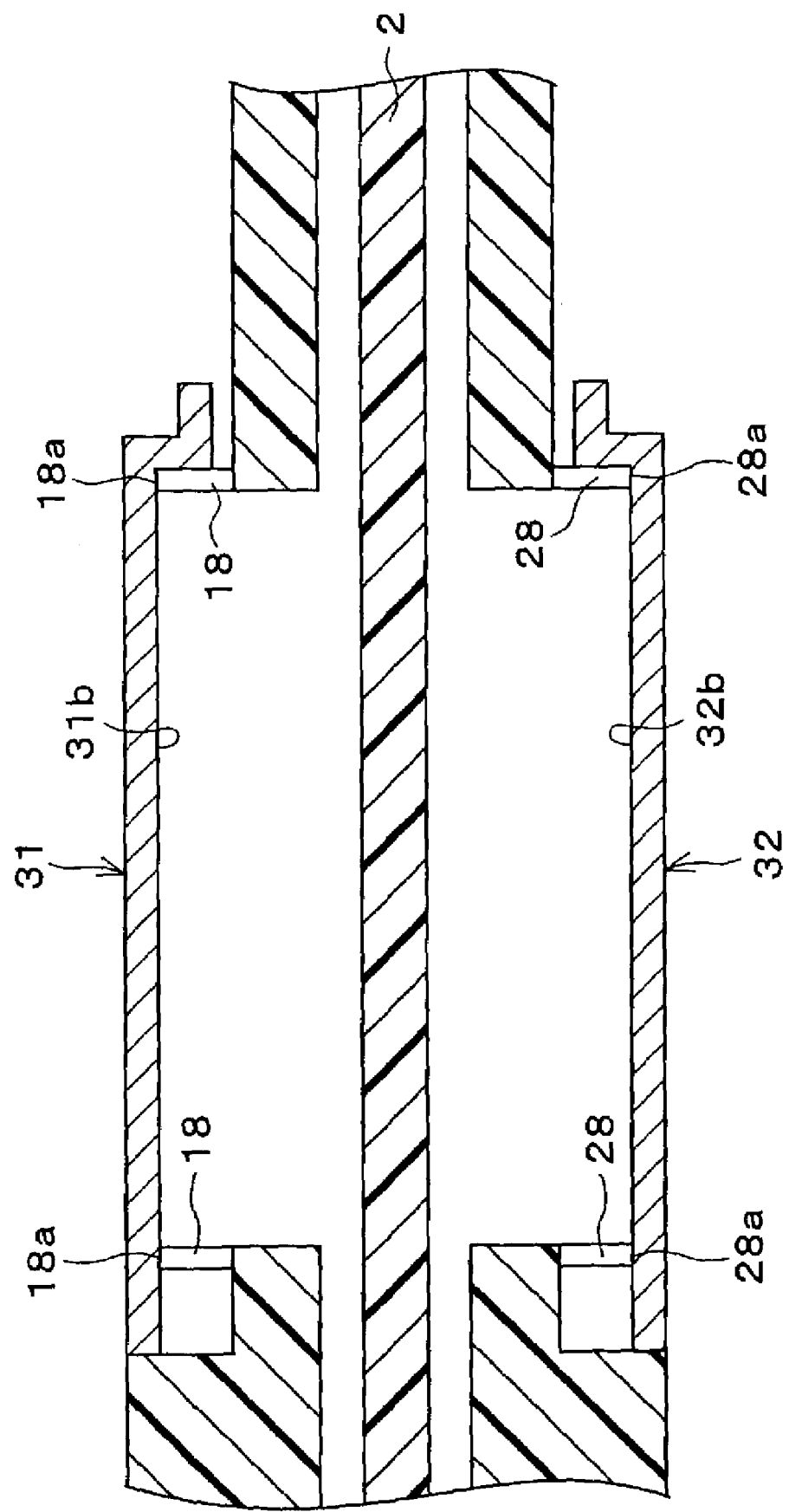
FIG. 6 is a sectional view of a disc cartridge of another embodiment of the present invention.
Figure 7:
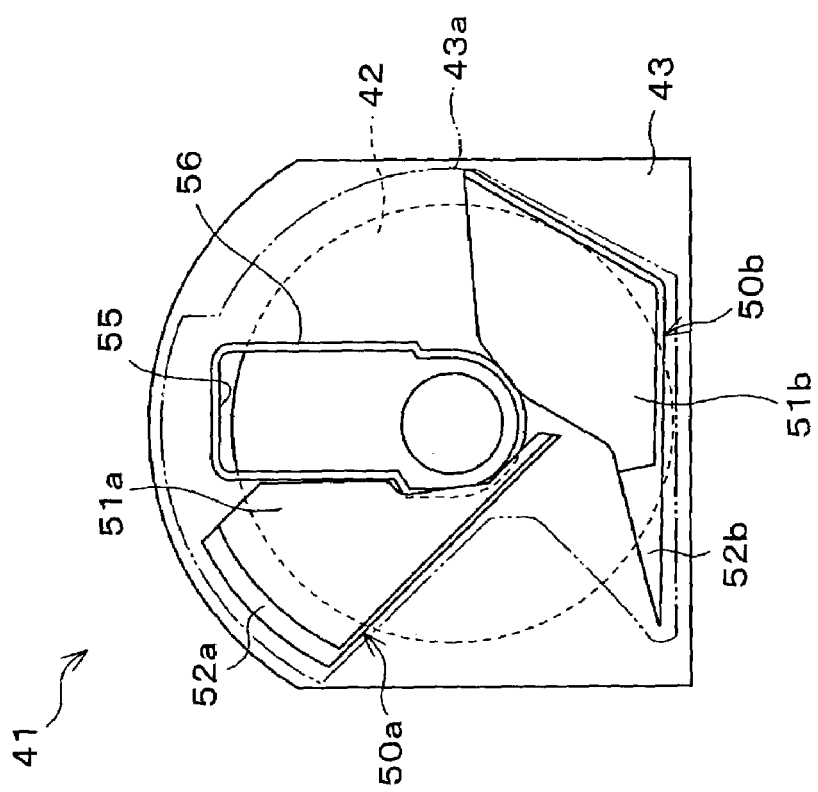
FIGS. 7(a) and 7(b) are schematic view of a disc cartridge of a still another embodiment of the present invention.
Figure 7:
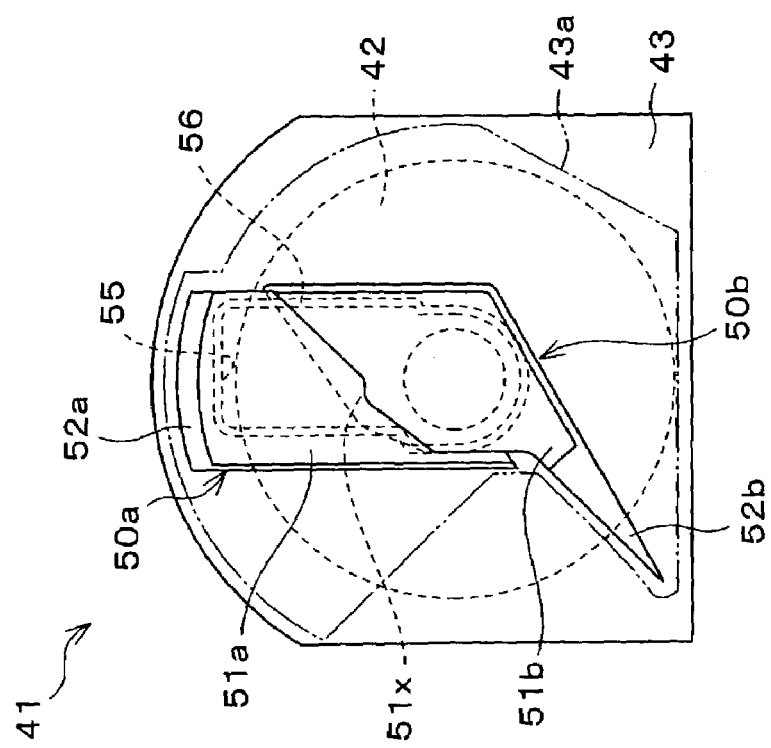
Figure 9:
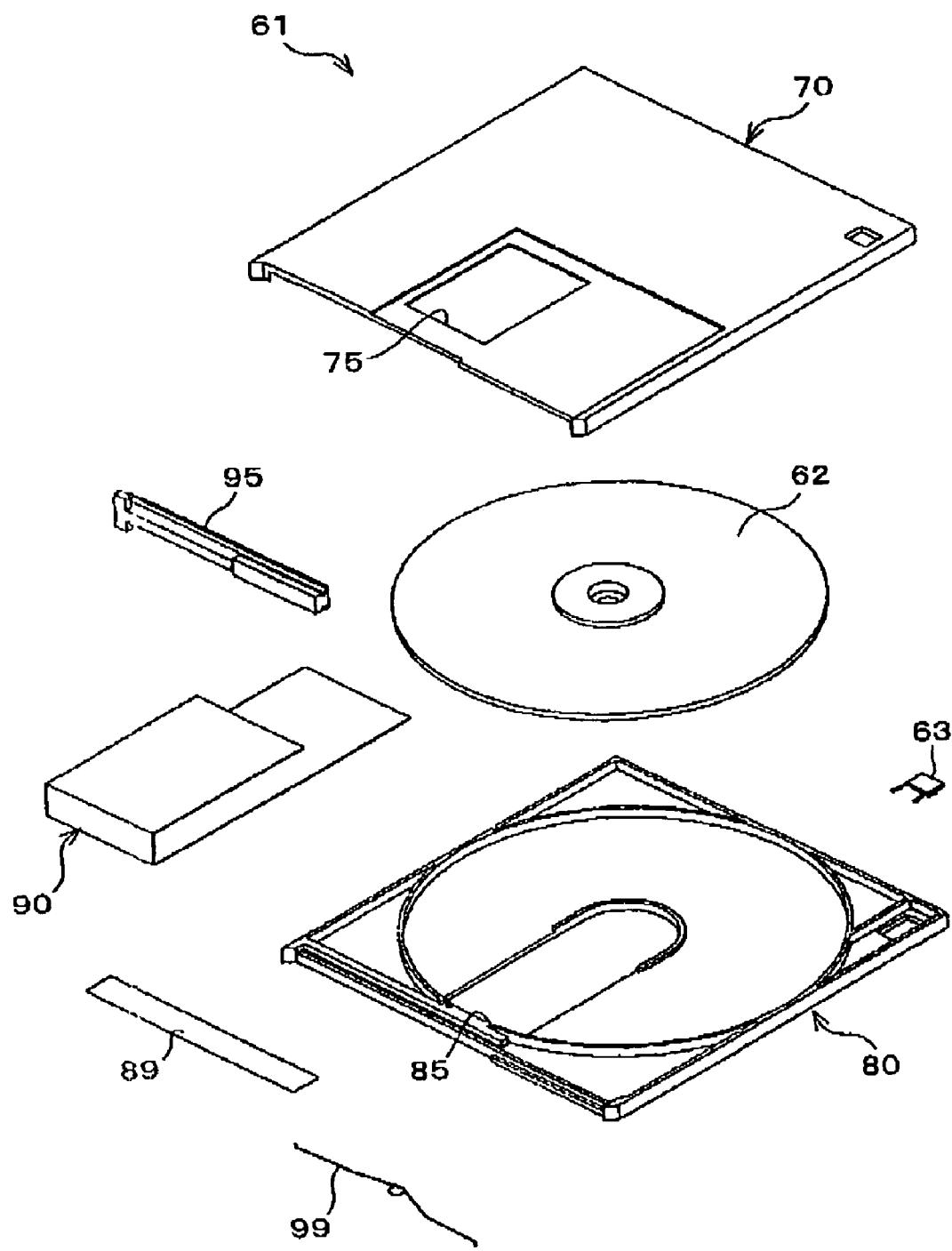
FIG. 9 is an exploded perspective view of the conventional disc cartridge.
Figure 10:
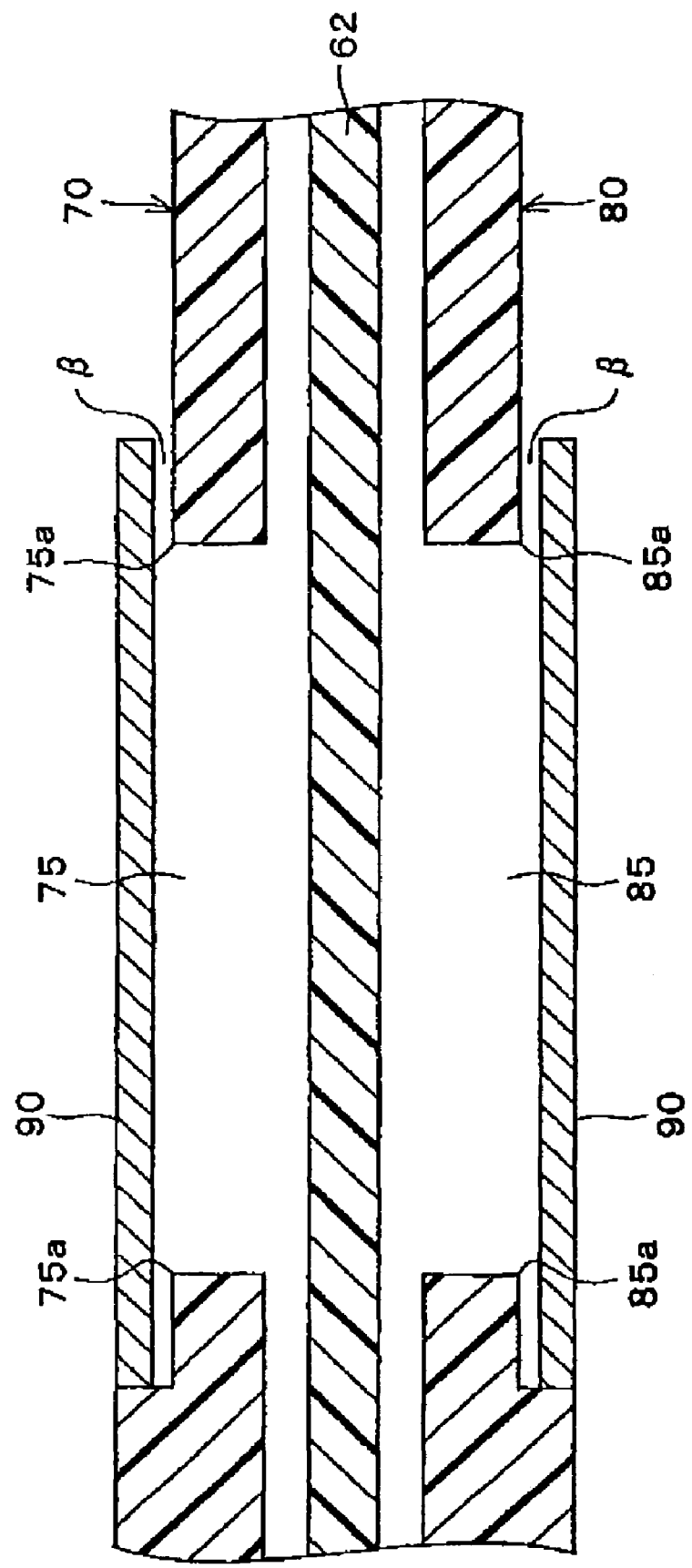
FIG. 10 is a sectional view taken of line C-C' of the disc cartridge shown in FIG. 8(a).

When the protrusion sections 18 and 28 are made of the elastic body having wear resistance, it may be arranged that the facing surfaces 31b and 32b of the shielding sections 31 and 32 of the shutter 30 touch protrusion top surfaces 18a and 28a of the protrusion sections 18 and 28, as shown in FIG. 6. Even if the facing surfaces 31b and 32b touch the protrusion top surfaces 18a and 28a of the protrusion sections 18 and 28 during the opening and closing of the shutter 30, the friction powder is hardly produced due to the wear resistance of the protrusion sections 18 and 28.

Moreover, because the protrusion sections 18 and 28 are made of the elastic body, the protrusion top surfaces 18a and 28a can cohere to the facing surfaces 31b and 32b, respectively when the shutter 30 is closed. Further, when the interior surfaces 31c and 32c of the shielding sections 31 and 32 of the shutter 30 abut against the protrusion sections 18 and 28, respectively, the protrusion sections 18 and 28 are deformed so as to cause the interior surfaces 31c and 32c to cohere to the protrusion sections 18 and 28.

Therefore, when the shutter 30 is closed, the openings 15 and 25 are closed tightly. Thus, the dust and the friction powder hardly reach the disc 2 via the openings 15 and 25. This improves the dust control of the disc cartridge 2, thereby making the disc cartridge 2 more reliable.

Especially, when the protrusion sections 18 and 28 are made of an elastic body having an appropriate elasticity such as brushes or the like, the friction between the shutter 30 and the protrusion top surfaces 18a and 28a is so small that the opening and closing of the shutter 30 will not be hindered by the friction. Moreover, if an electrified brush is used as the body having wear resistance, the electrified brush catches the dust, the friction powder, and the like. With this arrangement, it is possible to reduce the dust and friction powder that enter the openings 15 and 25.

In the disc cartridge having the above arrangement, when the disc cartridge is inserted into a recording/reproducing apparatus (not shown), the shutter is opened so that the disc cartridge will be in the opening state so as to expose part of the disc via the openings, as described above. As a disc cartridge 200 is inserted into the recording/reproducing apparatus, a recording/reproducing head 240, which functions as a magnetic head, an optical head, and the like, enters the disc cartridge 200 from a side thereof that faces the plateau 12, as shown in FIG. 13(a), for example. The recording/reproducing head 240 sandwiches the disc cartridge 200. Here, a tip part 240a of the recording/reproducing head 240 approaches a disc 2 via an opening 15 of the disc cartridge 200. With this arrangement, it is possible to record/reproduce data from/to the disc 2. As the disc 2 rotates, the recording/reproducing head 240 moves in a diameter direction of the disc 2, that is, in a perpendicular direction to rotating direction of the disc 2, as indicated by the arrow M in the FIG. 13(a). While moving in the diameter direction, the recording/reproducing head 240 sequentially records/reproduces data from/on the disc 2.

Note that, hereinafter, that side from which the recording/reproducing head 240 approaches the disc cartridge 200 is denoted as a head approaching side (recording/reproducing head approaching side) 250.

Moreover, for easy explanation, the disc cartridge 200 shown in FIG. 13(a) is so illustrated that the location of a plateau 12 and that of the shutter sliding surface 14, which are provided along a side surface section 17 of the upper half 10, are transposed compared with the disc cartridge 1 shown in FIG. 2. Therefore, a shutter 30 in the disc cartridge 200 slides in a different direction from that of the shutter 30 in the disc cartridge 1. However, the shutter 30 in the disc cartridge 200 is not different from that in the disc cartridge 1 in terms of functions. Therefore, the same reference numerals are used in the disc cartridges 200 for easy explanation. In other words, the explanation on the disc cartridge 1 illustrated in FIGS. 1 and 6 is applicable to the disc cartridge 200 as well. Moreover, the explanation on the disc cartridge 200 (see FIG. 13(a)) and explanation on a later described disc cartridge 201 (see FIGS. 13(b) and 14) are applicable to the disc cartridge 1.

The recording/reproducing head 240 is provided with the tip part 240a, which is the recording/reproducing head, and a head basement section 240b on the head approaching side 250 of the disc cartridge 200. The tip part 240a of the recording/reproducing head 240 is positioned at the opening 15. Therefore, the recording/reproducing head 240, as shown in FIG. 13(a), has a size large enough to deal with a distance between the head approaching side 250 of the disc cartridge 200 and the opening 15.

On the other hand, as shown in FIG. 13(b), a disc cartridge 201 having a notch section 251 may be used. The notch section 251 is provided for indicating which side of the disc cartridge 201 goes in first in inserting the disc cartridge 201 into the recording/reproducing apparatus. In the disc cartridge 201, the notch section 251 is provided on a side of a cartridge main body. Therefore, the disc cartridge 201 is inserted into the recording/reproducing apparatus in such a manner that the side on which the notch section 251 is provided goes in first, as indicated by the arrow N in FIG. 13(b). With the arrangement in which the notch section 251 is provided, the disc cartridge 201 is inserted and loaded in the recording/reproducing apparatus in such a manner that the side on which the notch section 251 is provided goes in first. This makes it easier to judge which side of the disc cartridge 201 goes in first in inserting the disc cartridge 201 in the recording/reproducing apparatus.

Moreover, in the disc cartridge 201 of the present embodiment, as shown in FIG. 13(b), the notch section 251 is provided in part of a head approaching side 250 that is the side from which a recording/reproducing head 240 of a recording/reproducing apparatus approaches. Specifically, the disc cartridge 201 is so arranged that the head approaching side 250 of the disc cartridge 200 shown in FIG. 13(a) is notched in an arbitrary shape. In order to form the notch section 251, the disc cartridge 201 has the cartridge main body structured by combining together a upper half 210 and a lower half 220 shown in FIG. 13(b). Note that notching sides of the upper and lower halves 10 and 20 (see FIG. 13(a)) give the upper and lower halves 210 and 220.

Therefore, a distance between the notch section 251 and an opening 15 in the disc cartridge 201 shown in FIG. 13(b) is shorter than the distance between the head approaching side 250 and the opening 15 in the disc cartridge 200 shown in FIG. 13(a) by ΔL (see FIG. 13b). Therefore, when the disc cartridge 201 shown in FIG. 13(b) is used, the recording/reproducing head 240 can move into the notch section 251. In other words, the recording/reproducing head 240 is contained in the notch section 251. Therefore, it is possible to downsize the recording head 240. As a result, it is possible to downsize a disc driver (not shown) of the recording/reproducing apparatus.

As described above, in the disc cartridge 201, the recording/reproducing head approaching side 250, from which the recording/reproducing head for recording/reproducing data from/on the recording medium approaches is provided with the notch section 251 in which part of the recording/ reproducing head can be contained. Therefore, the recording/reproducing head 240 of the recording/reproducing apparatus is only required to have a side large enough to deal with the distance between the notch section 251 and the opening 15. Thus, it is possible to downsize the recording/reproducing head. As a result, it is possible to downsize the disc drive of the recording/reproducing apparatus.

FIG. 13(*b*), illustrates the case where the recording/reproducing head 240 of the disc cartridge 201, approaches from the upper half 210. However, even if the recording/reproducing head 240 approaches from the lower half 220, the provision of such notch section 251 as above attains downsizing of a disc driver of a recoding/reproducing head 240 and the disc drive of the recording/reproducing apparatus, similarly.

Figure 14:
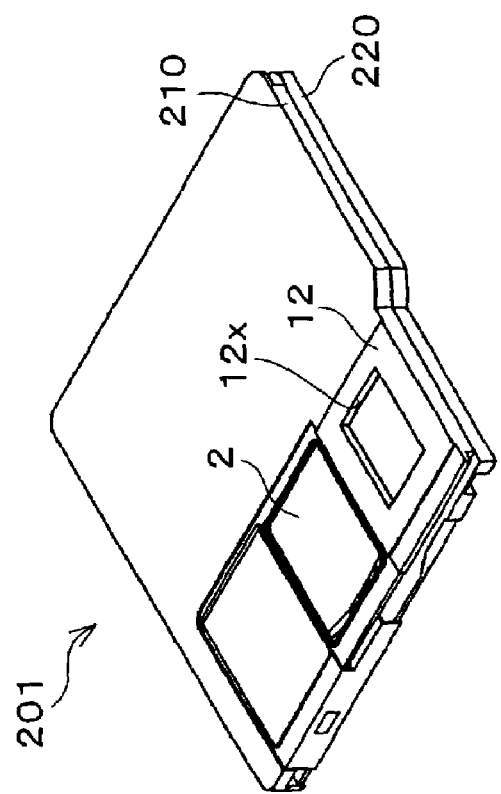
Figure 14:
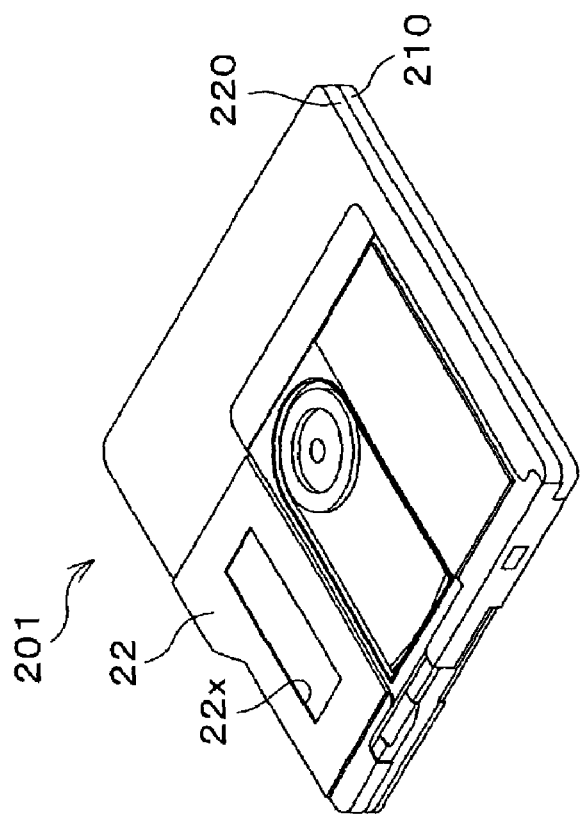
Figure 15:
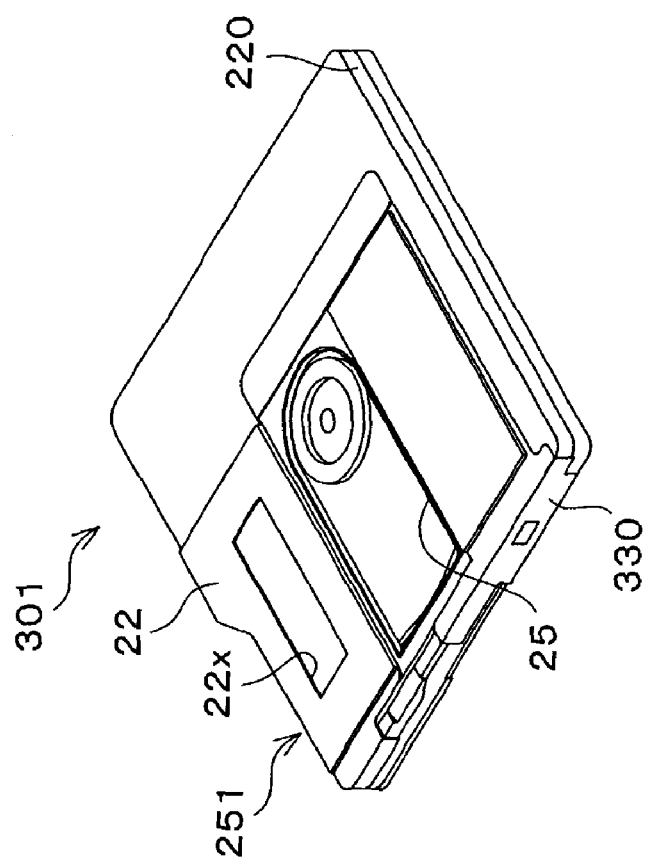
Figure 15:
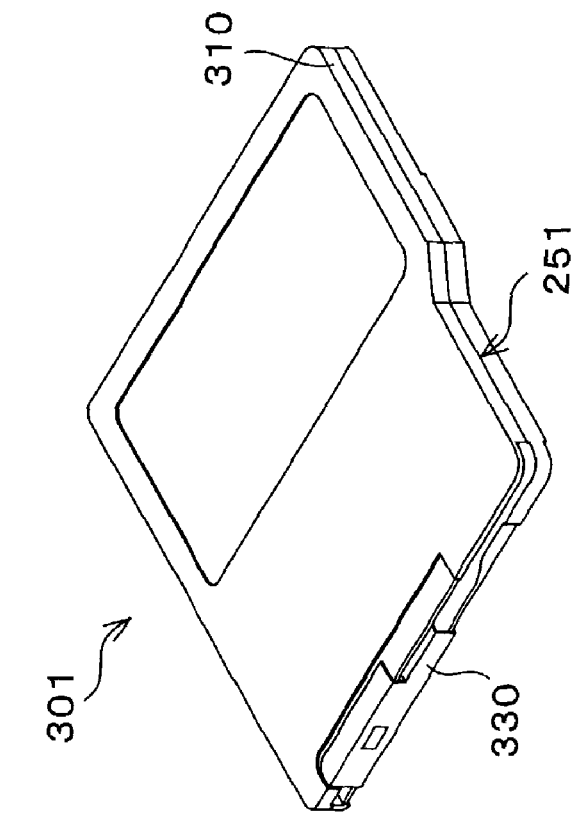

Moreover, the disc cartridge 201 of the present embodiment, as shown in FIGS. 14(*a*) and 14(*b*), may be provided with identification means attaching sections 12*x* and 22*x* respectively on a plateau 12 of an upper half 210 and a plateau 22 of a lower half 220. In the identification means attaching sections 12*x* and 22*x*, identification means (identification device) (not shown) are provided. The identification means, which is rewritable, identifiably stores data regarding a disc 2 contained in the disc cartridge 201.

Figure 3:
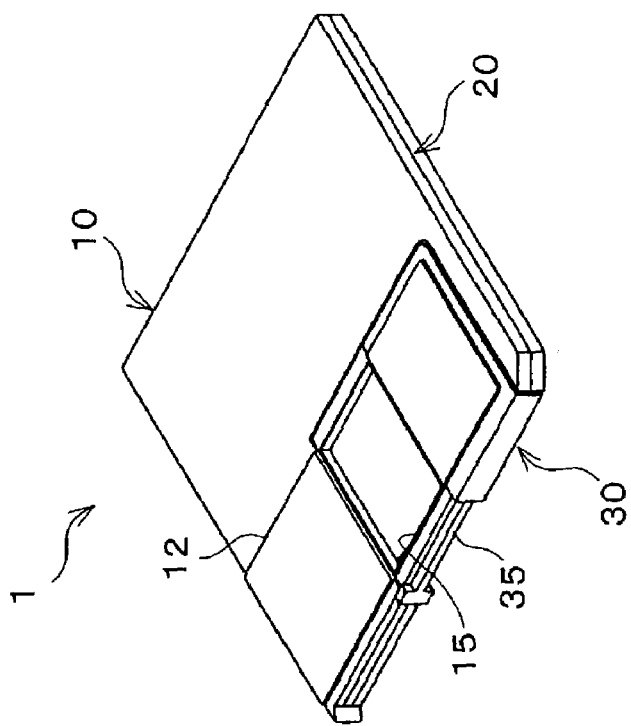
FIG. 3(a) is a perspective view showing the disc cartridge when a shutter is closed.
FIG. 3(b) is a perspective view showing the disc cartridge when shutter is opened.
Figure 3:
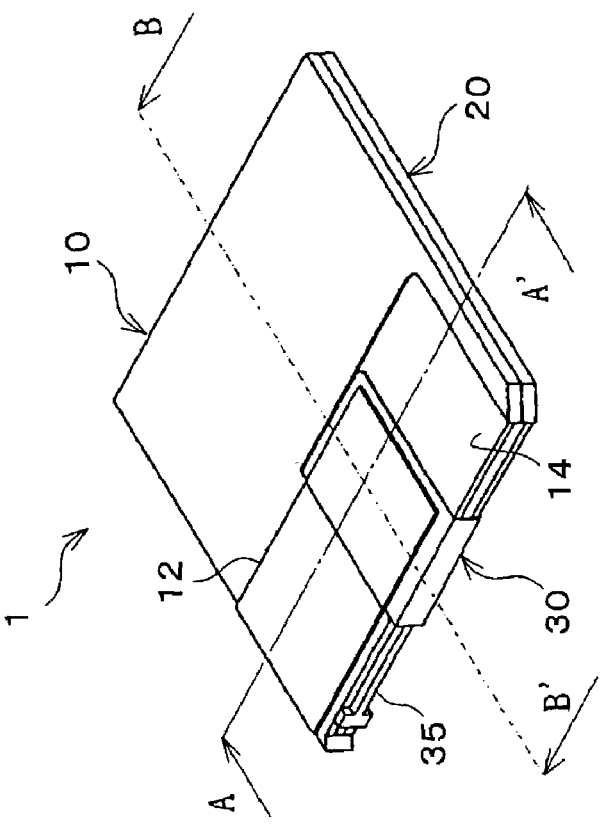

Note that similarly to the cartridge 200 (see FIG. 13(*a*)) in the disc cartridge 201 shown in FIGS. 14(*a*) and 14(*b*), a position of a plateau 12 of the upper half 10 and that of a shutter sliding surface 14 are transposed, compared with the disc cartridge 1 shown in FIG. 3(*a*). Moreover, FIGS. 14(*a*) and 14(*b*), a position of a plateau 22 of a lower half 20 and that of a shutter sliding surface 24 are transposed compared with those in FIG. 4. Therefore, the plateaus 12 and 22, the shutter sliding surfaces 14 and 24, and the shutter 30 in the disc cartridge 201 shown in FIGS. 14(*a*) and 14(*b*) are identical to those in the disc cartridge 1 shown in FIGS. 3(*a*) and FIG. 4 in terms of functions. Thus, those are labeled in the same way, and their explanation is omitted here.

The identification means may be, but not limited to, an RF-ID tag (Radio Frequency-Identification tag), which is an IC chip having an antenna, or a thermal recording element, such as a thermal label, and the like.

The identification means is preferably so positioned that the identification means will not abut against an inlet of the disc drive and will be fallen off in inserting the disc cartridge 201 into a recording/reproducing apparatus. Therefore, it is necessary that the identification means attaching sections 12*x* and 22*x* are deep enough not to let the identification means protrude out of top surfaces of the plateaus 12 and 22 as shown in FIGS. 14(*a*) and 14(*b*).

Specifically, for example, in case where an RF-ID tag, which has a thickness of about 0.5 mm, is used as the identification means, the identification means attaching sections 12*x* and 22*x* should have a thickness of 0.6 mm or more, considering the thickness of the RF-ID tag and an extra space of 0.1 mm or more, in order to mount the RF-ID tag so as not to stick out (protrude) from top surfaces of the upper and lower halves 210 and 220.

Usually, in an MD cartridge, which is one example of the disc cartridge 201 of the present embodiment, the upper and lower halves 210 and 220, excluding the plateaus 12 and 22, and shutter sliding surfaces 14 and 24 has a thickness of about 0.9 mm. Thus, if the identification means attaching section is provided in an area in which the thickness is about 0.9 mm, the thickness of the area in which the identification means attaching section is provided becomes about 0.3 mm, thereby deteriorating strength.

However, in the present embodiment, the identification means attaching section are provided in the plateaus 12 and 22 at which the thickness is comparatively greater than the other part of the surfaces of the upper and lower halves 210 and 220. Thus, even if such the identification means attaching sections are provided that are deep enough not to let the identification means such as the RF-ID tag and the like stick out from the surfaces of the upper and lower halves 210 and 220, the strength will not be deteriorated. As describe above, because the upper and lower halves 210 and 220 respectively have the plateaus 12 and 22, it is possible to provide the disc cartridge 201 with the identification means without deteriorating the strength of the upper and lower halves 210 and 220.

Moreover, in the disc cartridge 201, the identification means are provided on the exterior surfaces of the upper and lower halves 210 and 220. Because of this, it is possible to visibly record date/time data on the identification means in inserting or unloading the disc cartridges 200 and 201 in/out of the disc drive of the recording/reproducing apparatus. The date/time data represents date and/or time on/at which the data is recorded/reproduced on/from the disc 2. Specifically, when a thermal label is used as the identification means, and a recording/reproducing apparatus capable of perform recording on the thermal label by thermal transfer, it is possible to record date/time data on the thermal label in inserting and unloading the disc cartridge into the disc drive.

With this arrangement, it is possible to check, without loading the disc cartridge 201 into the recording/reproducing apparatus, the time/date at/on which the recording/reproduction of data on/from the disc 2 was performed. Thus, this improves the disc cartridge 201 in convenience.

Note that the present embodiment is explained using the time/date data as the data to be recorded on the identification means. However, the present invention is not limited to this. For example, the data to be recording on the identification means may be information as to the disc 2, such as a title of data recorded on the disc 2, a file format, and a data size.

Moreover, in the present embodiment, the identification means attaching sections are provided on the plateaus 12 and 22, against which the shutter 30 abuts when the shutter 30 is closed. However, the present invention is not limited to this. For example, it may be so arranged that a protruded shape area (protrusion surface area; plateau section) in which the identification means attaching section can be formed may be provided in the surfaces of the upper and lower halves 210 and 220. In this case, the protruded shape area is preferably protruded to such a height that hitching or the like trouble of the disc cartridge will not be caused inside the recording/reproducing apparatus in inserting/unloading the recording/reproducing apparatus of the disc cartridge, so as to avoid damaging the disc drive of the recording/reproducing apparatus and the disc cartridge 201.

Further, in the present embodiment, explained is the case where both of the upper and lower halves 210 and 220 of the disc cartridge 201 are provided with the identification means. However, the present invention may be so arranged that one of the upper and lower halves 210 and 220 is provided with the identification means.

Moreover, in the present embodiments, such disc cartridge that each of the upper and lower halves of the cartridge main body is provided with the opening, and the shutter to cover the openings are provided. However, the disc cartridge of the present invention is not limited to this. In short, the present invention is applicable to a disc cartridge in which only one of upper and lower halves is provided with an opening.

For example, as shown in FIGS. 15(a) and 15(b), the present invention is applicable to a disc cartridge 301 in which only a lower half 220 is provided with an opening 25, and a shutter 330 for opening and closing the opening 25 is provided. In short, as shown in FIG. 15(a), the disc cartridge 301 is so arranged that the upper half 310 is provided with no opening.

The arrangement which is explained above using the lower half 20 of the disc cartridge 1 (see FIGS. 1 to 6) is also applicable to the disc cartridge 301. Moreover, the disc cartridge 301 may be provided with a notch section 251 as discussed using the disc cartridge 201 (see FIGS. 13(b), 14(a), and 14(b)). Further, as shown in FIG. 15(b), it may be so arranged that a plateau 22 of the lower half 220 is provided with an identification means attaching section 22x.

Note that as described above it is preferable that the identification means attaching section is located in the plateau against which the shutter abuts. Therefore, in the disc cartridge in which only one of the upper and lower halves is provided with an opening, it is preferable that the plateau of that one of the upper and lower halves which is provided with an opening is provided with the identification means attaching section. Therefore, in the disc cartridge 301 shown in FIGS. 15(a) and 15(b), it is preferable that only the plateau 22 of the lower half 220 is provided with the identification means attaching section 22x, and the identification means such as the RF-ID tag and the thermal label, is provided in the identification means attaching section 22x.

Figure 12:
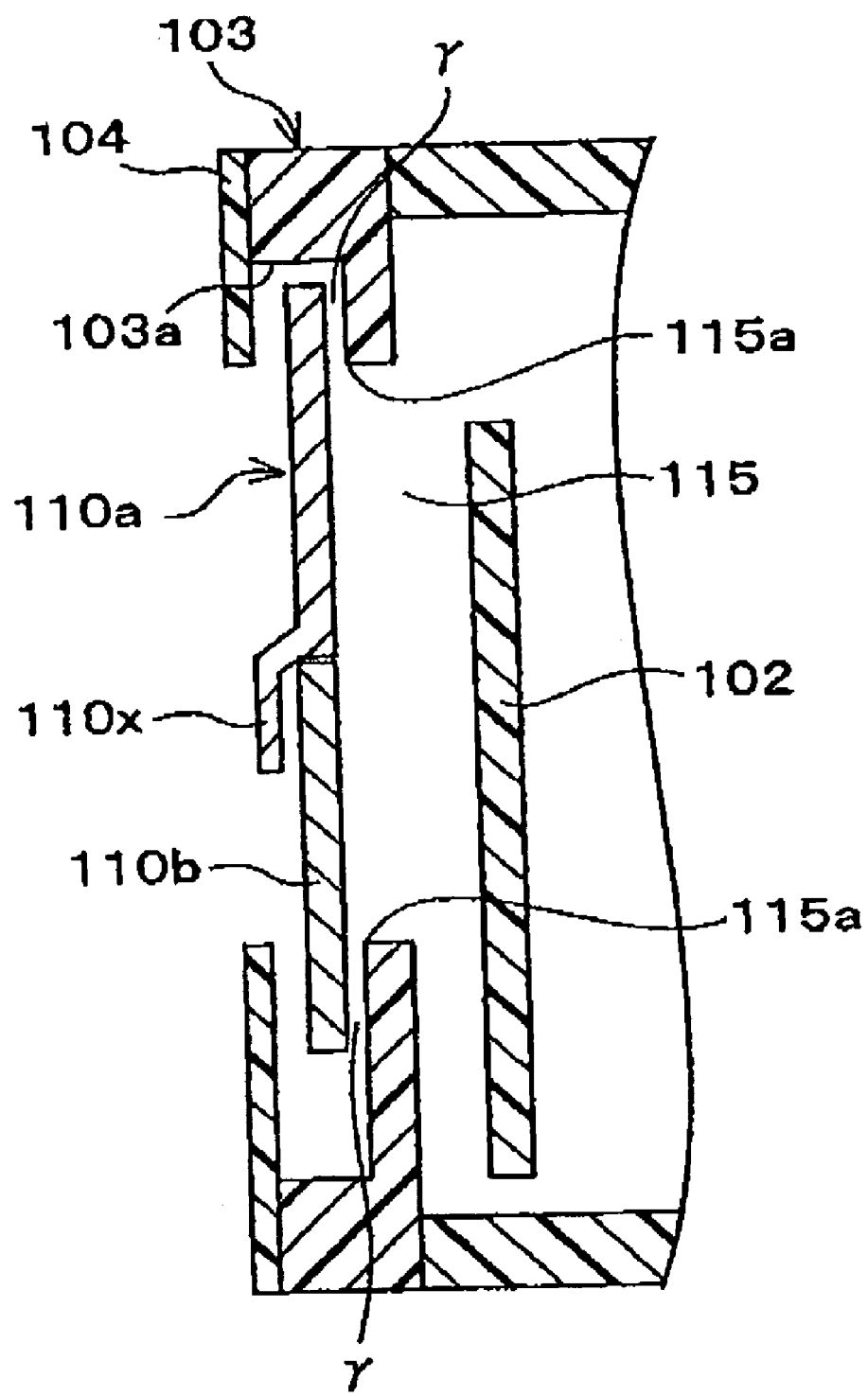
FIG. 12 is a sectional view taken of line D-D' of the disc cartridge shown in FIG. 11(a).

Moreover, the present embodiments are explained using the disc cartridges 1, 200, and 201 provided with one shutter 30. However, the present invention is applicable to a disc cartridge having two rotary shutters. Specifically, the present invention is applicable to the disc cartridge 101 explained referring to FIGS. 11(a), 11(b), and FIG. 12. Referring to FIGS. 7(a) and 7(b), a disc cartridge corresponding to the disc cartridge 101 shown in FIGS. 11(a), 11(b), and 12 is explained below.

A disc cartridge 41 shown in FIG. 7(a), which contains a disc 42 therein, is provided with an opening 55 for exposing part of the disc 42 from a cartridge main body 43. Around (in a periphery of) the opening 55, a protrusion section 56 is provided.

Moreover, in a recess section 43a of the cartridge main body 43, two shutters 50a and 50b are provided. The shutters 50a and 50b, which are of a rotary type, slide on the recess section 43a of the cartridge main body 43 so as to perform opening and closing operations. The shutters 50a and 50b are respectively provided with shielding sections 51a and 51b for covering the opening 55 and protrusion section 56 during the closing state, and sliding sections 52a and 52b for sliding on the recess section 43a during the opening and closing operations.

In the disc cartridge 41 is, as shown in FIG. 7(a), the shutters 50a and 50b abut against each other, so as to cover the opening 55 and protrusion section 56, whereby the shutters 50a and 50b are closed. Here, the shielding sections 51a and 51b of the shutters 50a and 50b, without touching a top section of the protrusion section 56, covers the openings 55 and protrusion section 56. When the shutters 50a and 50b are opened, as shown in FIG. 7(b), the two shutters 50a and 50b move away from each other by sliding on the recess section 43a, so as to expose the disc 42 via the opening 55. Note that the shielding sections 51a and 51b will not touch the top section of the protrusion section 56 during the opening and closing operations of the shutters 50a and 50b.

Therefore, when the shutters 50a and 50b are closed, even if dust or grime goes into a gap between the recess section 43a of the cartridge main body 43 and the sliding sections 52a and 52b of the shutters 50a and 50b, the protrusion section 56 around the opening 55 prevents the dust and grime from entering the opening 55. In other words, in the disc cartridge 41, the protrusion section 56 functions as a barricade and prevents the dust and grime from entering the opening 55.

Moreover, even if friction was caused between the recess section 43a and the sliding sections 52a and 52b during the opening and closing operations of the shutters 50a and 50b, thereby producing friction powder, it is possible to prevent the friction powder from entering the opening 55 because the protrusion section 56 is provided. Further, because the shielding sections 51a and 51b of the shutters 50a and 50b do not touch with the top section of the protrusion section 56, no friction will be caused.

Therefore, again in the disc cartridge 41, it is possible to reduce the friction powder produced by the opening and closing operations of the shutters 50a and 50b, and reduce the dust and friction powder that enter the opening 55, thereby improving dust control in the disc cartridge 41. Thereby, the disc cartridge 41 attains higher reliability.

Note that, as described above, the protrusion section 56 may be made of an elastic body having wear resistance. In this case, the shielding sections 51a and 51b may touch the top section of the protrusion section 56. Moreover, it may be arranged that one of the shutters 50a and 50b has a side section made of an elastic body, the side section being abutted by the other of the shutters 50a and 50b. Further, it may be arranged that a canopy section 50x is provided at part of the shutter 50a against which the shutter 50b abuts. With this arrangement, as described above, it is possible to improve sealing property of the opening 55 when the shutters 50a and 50b are closed, and thus improve dust control in the disc cartridge 41.

Further, in the present embodiment, discussed are the applications of the present invention on the disc cartridges using the shutter spring so as to keep the shutters in the predetermined positions. However, the present invention is not limited to those. Specifically, the present invention is applicable to a disc cartridge using, instead of the shutter spring, a shutter lock, which is used in a general mini disc (MD) so as to keep the shutter in a predetermined position.

In the present embodiments, the cases in which a magneto-optical discs are used as the discs 2. However, the present invention is not limited to this. The present invention may use: CD (Compact Disc), CD-ROM (Compact Disc-Read Only Memory), CD-R (Compact Disk-Recordable), CD-RW (Compact Disc ReWritable), DVD (Digital Versatile Disc), DVD-ROM (Digital Versatile Disc-Read Only Memory), DVD-R (Digital Versatile Disc-Recordable), DVD-RW (Digital Versatile Disc-ReWritable), BD(Blue-Ray Disc) and the like optical data recording medium of a disc-like shape. Furthermore, a medium for recording/reproducing or medium for reproducing-only may be used as the disc cartridges 1 of the present embodiments. Specifically, a mini disc in which various kinds of a magnet-optical disc is contained, a floppy disc in which a magnet disc is contained, and the like may be used as the disc cartridges 1.

As described above, the disc cartridge of the preset invention is preferably so arranged that the protrusion section includes a touching section (side surface) located in a position other than a top of the protrusion section (protrusion top surface), and the shielding section touches the touching section when the shutter is closed.

With the above arrangement, in which the shielding section and the touching section of the protrusion section touch each other when the shutter is closed, no dust, grime, aforementioned friction powder, and the like will enter the opening, even if they enter the gap between the sliding section and the shutter sliding surface. Therefore, the dust, grime, and friction powder will not attach on the surface of the recording medium (disc). Thus, it is possible to provide a disc cartridge excellent in dust control.

Furthermore, the disc cartridge of the present invention is so arranged that a spring (shutter spring) is attached to the shutter, the spring pushing the shielding section against the touching section when the shutter is closed.

With the above arrangement, in which the shielding section is pushed against the touching section of the protrusion section by the spring force of the spring when the shutter is closed, it is possible to cause the shielding section and the touching section to cohere to each other. Thereby, it is possible to improve sealing of the opening in the closing state of the shutter. Thereby, it is possible to improve the disc cartridge in dust control.

Moreover the disc cartridge of the present invention is preferably so arranged that at least the touching section is made of an elastic material.

With the above arrangement, in which at least the touching section is made of an elastic material, the touching section is elastically deformed when the shielding section is pushed against the touching section of the protrusion section, thereby causing the shielding section against the touching section to cohere to each other. This improves the coherence between the shielding section and the touching section of the protrusion section, thereby improving the disc cartridge in the dust control property during the closing state of the shutter. In addition, it may be so arranged that the whole protrusion section is made of an elastic material.

Moreover, the disc cartridge of the present invention may be so arranged that the protrusion section is made of an elastic body having wear resistance.

With the above arrangement, in which the protrusion section has wear resistance, friction is hardly caused even if that surface of the shielding section (facing surface of the shielding section)which is parallel to the shielding section touches the protrusion section. Thus, the friction powder is hardly produced in this arrangement. Further, because the protrusion section has an elastic property, the protrusion section is elastically deformed and coheres to the shielding section, when the shielding section and the protrusion section touch each other. Thus, it is possible to attain sufficient coherence between the shielding section and the protrusion section.

Therefore, it is possible to reduce the amount of the dust, grime, and friction powder entering the opening from outside, and prevent the dust, grime, and friction powder from attaching on the surface of the recording medium. This prevents errors in recording/reproducing the recording medium due to the dust, grime, and friction powder. Thus, it is possible to provide a disc cartridge excellent in dust control.

Further, the disc cartridge of the present invention may be so arranged that the protrusion section has an electrostatic property.

With the above arrangement, in which the protrusion section has an electrostatic property, it is possible to catch the dust, grime and friction powder by using the protrusion section. This reduces the amount of the dust, grime, and friction powder that enter the opening (that is, with this arrangement, the dust, grime, and friction powder hardly enter the opening). Thus, it is possible to provide a disc cartridge excellent in dust control.

Moreover, a disc cartridge may be further provided with a trap section in at least part of a periphery of the protrusion section on the shutter sliding surface, the trap section having a recessed shape.

With the above arrangement, the dust, grime, the aforementioned friction powder, and the like, which enter from outside the gap between the sliding section and the shutter sliding surface, are trapped in the trap section. Thus, it is possible to reduce the amount of the dust, grime, the aforementioned friction powder, and the like that enter the opening and reach the recording medium. This improves the disc cartridge in dust control. Thus, it is possible to provide a disc cartridge capable of excellently performing recording/reproducing.

Furthermore, the disc cartridge of the present invention may be so arranged that the disc cartridge main body includes a notch section on that side thereof which firstly goes in a recording/reproducing apparatus in inserting the disc cartridge in the recording/reproducing apparatus, the recording/reproducing apparatus recording/reproducing the recording medium.

In this arrangement, provided is the notch section for finding out (judging) in which way the disc cartridge is inserted in loading the disc cartridge in the recording/reproducing apparatus. With this arrangement, it is possible to easily find out in which way the disc cartridge is inserted in loading the disc cartridge in the recording/reproducing apparatus.

Furthermore, the disc cartridge of the present invention may be so arranged that the notch section is provided on a recording/reproducing head approaching side (head approaching side) from which a recording/reproducing head provided on the recording/reproducing apparatus approaches.

With the above arrangement, in which part of the recording/reproducing head can go into the notch section, it is possible to miniaturize the recording/reproducing head, and thus miniaturize the disc drive of the recording/reproducing apparatus.

Moreover, a disc cartridge of the present invention may be so arranged to further include an identification means, in a surface of the disc cartridge main body, for identifiably recording thereon data regarding the recording medium.

With the above arrangement, it is possible to record on the identification means the information regarding the recording medium contained in the disc cartridge. Thus, the identification means provided on the surface of the cartridge main body allows to check the information without inserting (loading) the disc cartridge in the recording/reproducing apparatus.

Furthermore, a disc cartridge of the present invention may be further provided with at least one plateau section (plateau) so provided as to stick out from a surface of the cartridge main body, the plateau section including an identification means attaching section for attaching the identification means therein the identification means attaching section having a recessed shape.

With the above arrangement, the identification means attaching section having the recessed shaped is provided on the surface of the cartridge main body, the identification means will not be stuck out from the surface of the cartridge main body. Therefore, in inserting and unloading the disc cartridge in/from the recording/reproducing apparatus, it is possible to prevent such troubles that the identification means is fallen off from the disc cartridge and that the recording/reproducing apparatus or the identification means is damaged because the identification means touches the recording/reproducing apparatus.

Moreover, the identification means attaching section is provided in the plateau section relatively having a greater thickness, compared with the other part of the surface of the cartridge main body. This will not lead to insufficient strength due to the provision of the identification means attaching section causing too thin thickness.

Furthermore, the disc cartridge of the present invention is preferably so arranged that the shutter abuts the plateau section when the shutter is closed.

With this arrangement, the shutter is pushed against not only the touching section of the protrusion section but also the plateau section, by the spring force of the spring. Thus, the sealing of the opening during the closing state of the shutter is improved. Moreover, because the shutter is abutted against the plateaus section, the shutter is kept in a poison above the opening. This enables the shutter to stably cover the opening.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A disc cartridge, comprising;
   an opening provided in a cartridge main body, that contains a disc-like shaped recording medium in such a manner that the recording medium is allowed to rotate inside the cartridge main body, for exposing part of the recording medium;
   a shutter for opening and closing the opening, the shutter having a shielding section for covering the opening when the shutter is closed, and a sliding section for sliding on a shutter sliding surface of the cartridge main body during opening and closing operation;
   a protrusion section, provided on the shutter sliding surface of the cartridge main body and being arranged so as to be about at least a part of a periphery of the opening, the protrusion section being covered by the shielding section when the shutter is closed; and
   wherein the shutter is so provided to have a space between (i) a facing surface, of the shielding section which is substantially in parallel to the shutter sliding surface, and (ii) a top section of the protrusion section.

2. The disc cartridge as set forth in claim 1, wherein the protrusion section has a height less than or equal to a difference between a level of a surface of a facing surface and a level of the shutter sliding surface.

3. The disc cartridge as set forth in claim 1, wherein the protrusion section includes a touching section located in a position other than a top of the protrusion section, and the shielding section touches the touching section when the shutter is closed.

4. The disc cartridge as set forth in claim 3, wherein a spring is attached to the shutter, the spring pushing the shielding section against the touching section when the shutter is closed.

5. The disc cartridge as set forth in claim 3, wherein at least the touching section is made of an elastic material.

6. The disc cartridge as set forth in claim 3, wherein the protrusion section is made of an elastic body having wear resistance.

7. The disc cartridge as set forth in claim 6, wherein the protrusion section has an electrostatic property.

8. A disc cartridge as set forth in claim 1, further comprising:
   at least one plateau section so provided as to stick out from a surface of the cartridge main body, the plateau section being abutted by the shutter when the shutter is closed.

9. The disc cartridge as set forth in claim 8, wherein the protrusion section has a height less than or equal to a difference between a level of a top surface of the plateau section and that of the shutter sliding surface.

10. The disc cartridge as set forth in claim 8, wherein a spring is attached to the shutter, the spring pushing the shutter against the plateau section when the shutter is closed.

11. A disc cartridge as set forth in claim 1, further comprising:
    a trap section in at least part of a periphery of the protrusion section on the shutter sliding surface, the trap section having a recessed shape.

12. The disc cartridge as set forth in claim 1, wherein the disc cartridge main body includes a notch section, where the notch section is provided on that side of the disc cartridge main body which firstly goes in a recording/reproducing apparatus in inserting the disc cartridge in the recording/reproducing apparatus that records in/reproduces from the recording medium.

13. The disc cartridge as set forth in claim 12, wherein the notch section is provided on a recording/reproducing head approaching side of the disc cartridge main body, the recording/reproducing head approaching side being the side from which a recording/reproducing head provided on the recording/reproducing apparatus approaches.

14. A disc cartridge as set forth in claim 1, further comprising:
    an identification means, in a surface of the disc cartridge main body, for identifiably recording thereon data regarding the recording medium.

15. A disc cartridge as set forth in claim 14, further comprising:
    at least one plateau section so provided as to stick out from a surface of the cartridge main body,
    the plateau section including an identification means attaching section for attaching the identification means therein the identification means attaching section having a recessed shape.

16. The disc cartridge as set forth in claim 15 wherein the identification means attaching section has a depth deep enough not to let the identification means attached therein stick out from the surface of the cartridge main body.

17. The disc cartridge as set forth in claim 15, wherein the shutter abuts the plateau section when the shutter is closed.

18. The disc cartridge as set forth in claim 1, wherein the protrusion section extends from the shutter sliding surface in a direction fax from the recording medium.

* * * * *